United States Patent
Tsukuba et al.

(10) Patent No.: US 7,889,362 B2
(45) Date of Patent: Feb. 15, 2011

(54) IMAGE FORMING APPARATUS FOR PRINTING IMAGES PROPERLY ARRANGED RELATIVE TO INDEX TAB

(75) Inventors: Tomoyuki Tsukuba, Tokyo (JP); Yoh Masuyama, Kanagawa (JP); Masato Terao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 12/334,919

(22) Filed: Dec. 15, 2008

(65) Prior Publication Data

US 2009/0097071 A1 Apr. 16, 2009

Related U.S. Application Data

(62) Division of application No. 10/384,595, filed on Mar. 11, 2003, now Pat. No. 7,492,471.

(30) Foreign Application Priority Data

| Mar. 12, 2002 | (JP) | ............................. 2002-067572 |
| Mar. 12, 2002 | (JP) | ............................. 2002-067573 |
| Feb. 17, 2003 | (JP) | ............................. 2003-038748 |

(51) Int. Cl.
*G06K 15/02* (2006.01)
(52) U.S. Cl. .................. 358/1.12; 358/1.18; 358/488; 382/286; 382/287; 382/289; 382/291; 382/296; 382/295; 382/297
(58) Field of Classification Search .................. None
See application file for complete search history.

(56) References Cited

U.S. PATENT DOCUMENTS

| 4,703,515 | A | * | 10/1987 | Baroody, Jr. ................. 382/297 |
| 5,337,161 | A | * | 8/1994 | Hube .......................... 358/448 |
| 5,485,246 | A |   | 1/1996 | Hayashi et al. |
| 5,510,876 | A |   | 4/1996 | Hayashi et al. |
| 5,546,164 | A |   | 8/1996 | Hayashi et al. |
| 5,579,419 | A | * | 11/1996 | Yaguchi et al. ............. 382/305 |
| 5,646,739 | A | * | 7/1997 | Kawai ........................ 358/296 |
| 5,694,201 | A |   | 12/1997 | Hayashi et al. |
| 5,699,165 | A | * | 12/1997 | Suzuki et al. ............... 358/296 |
| 5,722,029 | A | * | 2/1998 | Tomidokoro et al. ........ 399/389 |
| 5,784,663 | A |   | 7/1998 | Hayashi et al. |
| 5,846,005 | A | * | 12/1998 | Britz et al. .................. 400/621 |
| 5,966,852 | A | * | 10/1999 | Drzewiecki .................. 40/360 |
| 6,099,189 | A | * | 8/2000 | Owen et al. .................... 402/79 |
| 6,111,667 | A | * | 8/2000 | Mishima et al. ............. 358/488 |
| 6,202,092 | B1 |  | 3/2001 | Takimoto |
| 6,266,151 | B1 | * | 7/2001 | Tachibana et al. ............ 358/1.4 |
| 6,361,639 | B1 | * | 3/2002 | Owen et al. .................. 156/211 |
| 6,441,918 | B1 | * | 8/2002 | Hori .......................... 358/1.16 |

(Continued)

*Primary Examiner*—Edward L Coles
*Assistant Examiner*—Pawandeep S Dhingra
(74) *Attorney, Agent, or Firm*—Oblon, Spivak, McClelland, Maier & Neustadt, L.L.P.

(57) ABSTRACT

An image forming apparatus prints images on print sheets, and insets tab-index sheets between the printed print sheets. The image forming apparatus includes an orientation detecting unit which detects an orientation of a print sheet being supplied, a rotation-angle selecting unit which selects a rotation angle of an image such that the image is arranged in an orientation matching the detected orientation of the print sheet and in a predetermined positional relationship with a tab of the tab-index sheets, and a printing unit which prints the image being rotated by the selected rotation angle.

9 Claims, 16 Drawing Sheets

U.S. PATENT DOCUMENTS

| | | | |
|---|---|---|---|
| 6,452,694 B1 * | 9/2002 | Eisenberg et al. ........... 358/1.18 |
| 6,496,281 B1 * | 12/2002 | Yamamoto et al. .......... 358/401 |
| 6,549,300 B2 * | 4/2003 | Motamed et al. ........... 358/1.18 |
| 6,583,891 B2 * | 6/2003 | Joyce ........................ 358/1.18 |
| 7,151,859 B2 * | 12/2006 | Yamaai ...................... 382/292 |
| 7,256,911 B2 * | 8/2007 | Takabayashi et al. ........ 358/1.9 |
| 2001/0046059 A1 * | 11/2001 | Motamed et al. ........... 358/1.12 |
| 2002/0051161 A1 * | 5/2002 | Kanazawa et al. .......... 358/1.12 |
| 2004/0104946 A1 * | 6/2004 | Li ............................... 345/853 |

* cited by examiner

IMAGE FORMING APPARATUS FOR PRINTING IMAGES PROPERLY ARRANGED RELATIVE TO INDEX TAB

CROSS-REFERENCE TO RELATED APPLICATIONS

This application is a divisional application of Ser. No. 10/384,595, filed Mar. 11, 2003 now U.S. Pat. No. 7,492,471, the entire contents of which is incorporated herein by reference. U.S. Ser. No. 10/384,595 is based upon and claims benefit of priority from the prior Japanese Patent Application Nos. 2002-067572, filed on Mar. 12, 2002, 2002-067573, filed on Mar. 12, 2002, and 2003-038748, filed on Feb. 17, 2003.

BACKGROUND OF THE INVENTION

1. Field of the Invention

The present invention generally relates to image forming apparatuses capable of printing on index sheets, and particularly relates to an image forming apparatus and an image processing program which are capable of proper printing on index sheets by avoiding inconsistency between the printing orientation and the index direction.

2. Description of the Related Art

Widespread use of DTP (desktop publishing) facilitated by the spread of personal computers is not only changing household activities but also the type of work that is conducted at office. In the conventional process of bookbinding, a fully bound book will not be available for a number of days after requesting bookbinding to a bookbinder. Image forming apparatuses are nowadays connected to peripheral devices capable of bookbinding, and can take care of a front cover, chapter delimiters, stapling, and punching, providing a fully bound book on the spot.

In such bookbinding by image forming apparatuses, it is well known to insert chapter-separating sheets (e.g., see Japanese Patent Application Publication No. 2001-278530). If an tab-index sheet having a tab projecting from a standard-size sheet is used as a chapter-separating sheet, readers can easily find the chapter that the readers wish to read.

A tab-index sheet, however, is generally comprised of a standard-size sheet and a tab projecting from this standard-size sheet, as described above. In most image forming apparatuses of the conventional art, the projecting tab needs to be situated on the rear side when the sheet is carried inside the apparatus.

This is because the printing method of conventional image forming apparatuses requires such positioning. When images are to be printed on sheets, generally, the front end of the sheets being conveyed are aligned with the front tip of the images. To this end, image forming apparatuses conveys the sheets such that the front end of the sheets being conveyed is struck against the resist rollers, thereby compensating for skews generated during the conveyance of the sheets and carrying out printing at proper timing.

If a tab is situated at the front end in such a printing scheme as described above, image forming apparatuses would have difficulty aligning the front tip of images to the front end of tab-index sheets unless special equipment is provided. Accordingly, tabs are always positioned at the rear end when tab-index sheets are conveyed.

When a sheet that is horizontally or vertically asymmetrical because of the indexing tab is used, an orientation in which an image is printed should be taken care of. If the tab should come at the top right corner of an image, the image should be printed in such a position.

Image forming apparatuses are generally provided with a function to rotate a scanned image when printing the image. If a A4 document sheet is set in a vertical position as viewed from the user, and if a A4 print sheet is set in a horizontal position in an image forming apparatus, for example, the image scanned in the vertical position can be rotated to be in a horizontal position so as to match the position of-the print sheet.

The rotation of an image may be set to 0 degree, 90 degrees, 180 degrees or 270 degrees if there are no particular limitations.

In general, the rotational angle of an image is determined based on an algorithm that takes into account an operation mode relating to a document size, sorting, stacking, tray selection, etc.

Conventional image forming apparatuses do not take into account the orientation of an image relative to an indexing tab such as when the tabs come at the right-hand-side edge of the book that is bound on the left-hand-side edge.

Further, a problem arises when the direction of the indexing tab does not match the position of stapling or the position of punching as in the case in which the orientation of printed images is limited by stapling or punching.

Moreover, conventional image forming apparatuses do not match the orientation of images with the orientation of the first image at the time of printing by using the first image of a document as a reference. Because of this, images printed on different pages may be oriented in different directions, thereby making it difficult to bind the book after printing.

Accordingly, there is a need for an image forming apparatus and an image processing program which can properly set the orientation of images so as to make it match the direction of a tab of a tab-index sheet.

SUMMARY OF THE INVENTION

It is a general object of the present invention to provide an image forming apparatus and an image processing program that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image forming apparatus and an image processing program particularly pointed out in the specification in such full, clear, concise, and exact terms as to enable a person having ordinary skill in the art to practice the invention.

To achieve these and other advantages in accordance with the purpose of the invention, the invention provides an image forming apparatus which prints images on print sheets, and insets tab-index sheets between the printed print sheets. The image forming apparatus includes an orientation detecting unit which detects an orientation of a print sheet being supplied, a rotation-angle selecting unit which selects a rotation angle of an image such that the image is arranged in an orientation matching the detected orientation of the print sheet and in a predetermined positional relationship with a tab of the tab-index sheets, and a printing unit which prints the image being rotated by the selected rotation angle.

According to another aspect of the present invention, the image forming apparatus as described above further includes a unit which selects the tab-index sheets by specifying the orientation of the tab-index sheets.

According to another aspect of the present invention, the image forming apparatus as described above further includes a unit which selects a tray that contains tab-index sheets matching a size of the images.

According to another aspect of the present invention, said rotation-angle selecting unit rotates the image such that a tab position specified for the image matches a tab position of the selected tab-index sheets.

According to another aspect of the present invention, said rotation-angle selecting unit checks whether the image is a first image, said rotation-angle selecting unit arranging the image in an orientation matching an orientation of the print sheet if the image is the first image, and arranging the image in an orientation matching an orientation of a sheet on which the first image is printed if the image is not the first image.

According to another aspect of the present invention, a record medium has a program embodied therein for causing a processor to select a rotation angle of an image that is to be printed by an image forming apparatus using tab-index sheets. The program includes a program code configured to detect an orientation of a print sheet being supplied, and a program code configured to select the rotation angle of the image such that the image is arranged in an orientation matching the detected orientation of the print sheet and in a predetermined positional relationship with a tab of the tab-index sheets.

According to another aspect of the present invention, a record medium has a program embodied therein for causing a processor to select a rotation angle of an image that is to be printed by an image forming apparatus. The program includes a program code configured to check whether the image is a first image, and a program code configured to select the rotation angle of the image such that the image is arranged in an orientation matching an orientation of a print sheet if the image is the first image, and configured to select the rotation angle of the image such that the image is arranged in an orientation matching an orientation of a sheet on which the first image is printed if the image is not the first image.

According to another aspect of the present invention, a record medium has a program embodied therein for causing a processor to select a rotation angle of an image that is to be printed by an image forming apparatus using tab-index sheets. The program includes a program code configured to detect an orientation of a print sheet being supplied, a program code configured to select the rotation angle of the image such that the image is arranged in an orientation matching the detected orientation of the print sheet and in a predetermined positional relationship with a tab of the tab-index sheets, a program code configured to check whether the image is a first image, and a program code configured to select the rotation angle of the image such that the image is arranged in an orientation matching an orientation of the print sheet if the image is the first image, and configured to select the rotation angle of the image such that the image is arranged in an orientation matching an orientation of a sheet on which the first image is printed if the image is not the first image.

According to another aspect of the present invention, a record medium has a program embodied therein for causing a processor to control printing of an image that is printed by an image forming apparatus using tab-index sheets. The program includes a program code configured to select a position of a tab relative to the image, and a program code configured to rotate the image such that the selected position of a tab relative to the image matches a position of a tab of the tab-index sheets.

According to another aspect of the present invention, a record medium has a program embodied therein for causing a processor to control printing of an image that is printed by an image forming apparatus using tab-index sheets. The program includes a program code configured to select two positions of a tab relative to the image, and a program code configured to rotate the image such that a position of a tab of the tab-index sheets matches either one of the two selected positions of a tab relative to the image.

According to another aspect of the present invention, a record medium has a program embodied therein for causing a processor to control printing of an image that is printed by an image forming apparatus using tab-index sheets. The program includes a program code configured to select two positions of a tab relative to the image while specifying one of the two positions as a preferred position, and a program code configured to rotate the image such that a position of a tab of the tab-index sheets matches either one of the two selected positions of a tab relative to the image where said specified one of the two selected positions is preferred over another one if both of the two selected positions of a tab relative to the image match the position of a tab of the tab-index.

According to another aspect of the present invention, the program further includes a program code unit configured to suspend the printing of the image and notify a user if the selected position of a tab relative to the image does not match the position of a tab of the tab-index sheets or if the position of a tab of the tab-index sheets does not match either one of the two selected positions of a tab relative to the image.

As described above, the present invention provides an image forming apparatus and a record medium having a program embodied therein for selecting the orientation of an image such as to make it match the position of a tab of a tab-index sheet.

Other objects and further features of the present invention will be apparent from the following detailed description—when read in conjunction with the accompanying drawings.

DESCRIPTION OF THE PREFERRED EMBODIMENTS

In the following, embodiments of the present invention will be described with reference to the accompanying drawings.

Figure 1:
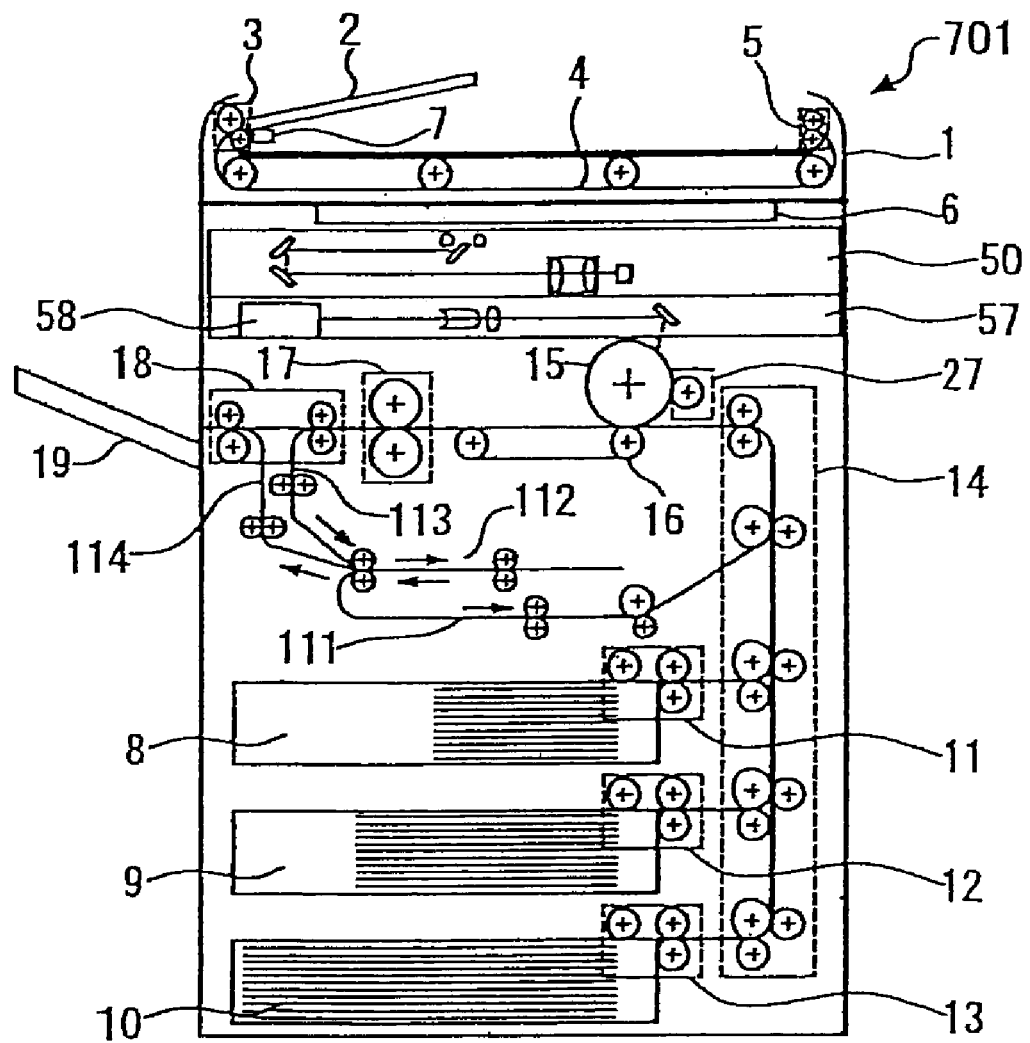
FIG. 1 is an illustrative drawing showing a schematic construction of a multi-function unit that is an example of an image forming apparatus of the present invention.

FIG. 1 is an illustrative drawing showing a schematic construction of a multi-function unit 701 that is an example of an image forming apparatus of the present invention.

The multi-function unit 701 includes an automatic-document feeder (hereinafter referred to ADF) 1, a document platform 2, a scan unit 50, an imaging unit 57, a development unit 27, a fixing unit 17, and sheet-supply devices 11, 12, and 13. The multi-function unit 701 further includes devices such as an operation unit, sheet-supply rollers, clutches, motors, etc., which are not shown.

The ADF 1 automatically feeds document sheets that are placed on the document platform 2. In detail, a stack of document sheets is placed on the document platform 2 with their document images facing up. Pressing down of a print key 33 of an operation unit 30 (see FIG. 4) starts the feeding of the document sheets. The document sheets are taken out one by one from the bottom of the stack, and are carried to a predetermined position on a contact glass 6 by sheet-supply rollers 3 and sheet-supply belt 4.

A count function counts up the count of document sheets each time the supply of a sheet is completed, thereby controlling the number of document sheets that are scanned. A document sheet positioned on the contact glass 6 is scanned by the scan unit 50, thereby producing image data. The document sheet for which scanning is finished is ejected by the sheet-supply belt 4 and ejecting rollers 5. If a document detector 7 detects the presence of a next document sheet on the document platform 2, this document sheet is supplied on to the contact glass 6 in the same manner as the preceding sheet. The sheet-supply rollers 3, the sheet-supply belt 4, and the ejecting rollers 5 are driven by motors.

The imaging unit 57 controls a laser beam of a laser outputting unit 58 based on image forming data that is generated from the image scanned by the scan unit 50, and forms a latent image by scanning the laser beam on a photosensitive body 15. The photosensitive body 15 carrying the latent image ends up having toner attached to the latent image as it passes the development unit 27. This creates a toner image. The conveyer belt 16 conveys a sheet at a rate that matches the rotation of the photosensitive body 15 that carries the toner image, thereby transferring the toner image from the photosensitive body 15 to the sheet.

Print sheets or tab-index sheets stacked in the first tray 8, the second tray 9, and the third tray 10 are carried by the first sheet-supply device 11, the second sheet-supply device 12, and the third sheet-supply device 13, respectively, and are further conveyed by a vertical conveyer unit 14 to the photosensitive body 15. A sheet having a transferred toner image is processed by the fixing unit 17 that fixes the image, and is ejected on to a paper-ejection tray 19 by a paper-ejection unit 18.

When images are to be printed on both sides of a sheet, a sheet taken out from the first tray 8, the second tray 9, or the third tray 10 is not led to the paper-ejection tray 19 after the image formation. Instead, the sheet is let into a double-side.-sheet-carrying path 113, and is flipped over by an inverting unit 112, followed by being supplied to a double-sided-sheet-carrying unit 111. This sheet is then supplied to the vertical conveyer unit 14 again, and an image is printed on a second side of the sheet, followed by the ejection of the sheet.

When there is a need to eject a sheet after flipping it over, a sheet that is flipped over by the inverting unit 112 is sent to an inverted-sheet-conveyer path 114 rather than to the double-sided-sheet-carrying unit 111, followed by the ejection of the sheet.

The photosensitive body 15, the conveyer belt 16, the fixing unit 17, the paper-ejection unit 18, and the development unit 27 are driven by motors. The first sheet-supply device 11, the second sheet-supply device 12, and the third sheet-supply device 13 are driven by the torque of a main motor propagated by respective sheet-supply clutches. The vertical conveyer unit 14 is driven by the torque of the main motor that is propagated by an intermediate clutch.

When the auto-selection of a paper-sheet tray (APS) is activated, a proper paper-sheet tray is automatically selected based on a copy mode and a document size, which will be described later. When the manual selection of a paper-sheet tray is chosen, the user selects a desired tray. When a front-cover mode, a chapter separation mode, or a sheet insertion mode is chosen, a front-cover tray and a tab-index sheet tray are selected in addition to the paper-sheet tray based on pre-determined settings or given selection.

Figure 2:
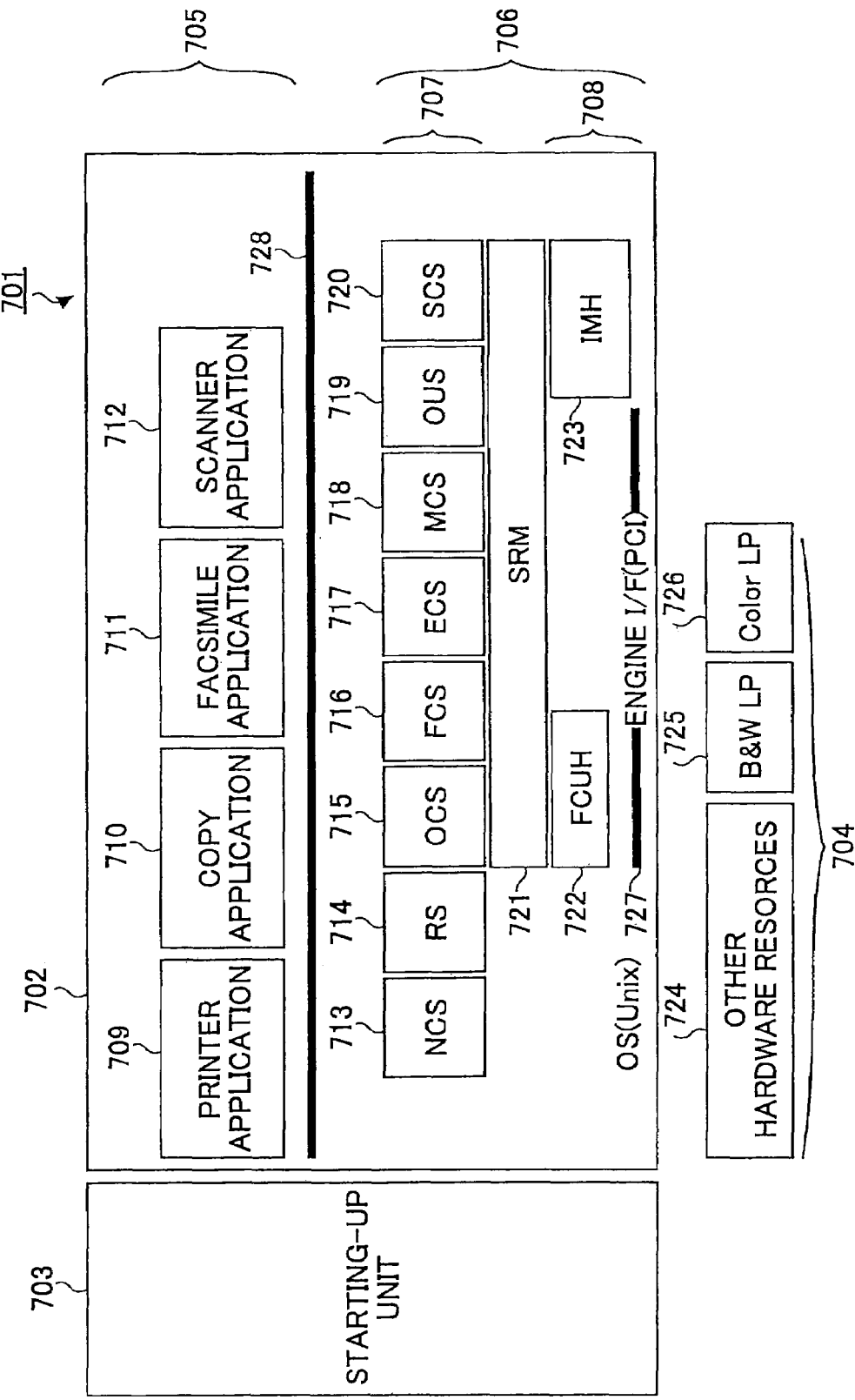
FIG. 2 is a block diagram showing a set of software units, a starting-up unit, and hardware resources.

In the following, software installed in the multi-function unit 701 will be described with reference to FIG. 2. FIG. 2 is a block diagram showing a set of software units 702, a starting-up unit 703, and hardware resources 704.

The starting-up unit 703 is driven first at the time of power on of the multi-function unit 701, and activates an application layer 705 and a controller 706. The starting-up unit 703 may read programs of the application layer 705 and the controller 706 from a hard-drive (hereinafter referred to as HD) or the like, and loads the programs to the memory space, followed by executing them. The hardware resources 704 includes a black-&-white laser printer 725, a color laser printer 726, and hardware resources 724 that include a scanner, a facsimile, etc.

In the present embodiment, the multifunction unit 701 may be provided only one of the black-&-white laser printer 725 and the color laser printer 726.

The set of software units 702 includes the application layer 705 and the controller 706, which run on an operation system (hereinafter referred to as OS) such as a UNIX. The application layer 705 includes programs for performing user-service-specific processes that relate to image formation where such services may include printing, copying, faxing, and scanning.

The application layer 705 includes a printer application 709 for printing, a copy application 710 for copying, a facsimile application 711 for faxing, and a scanner application 712 for scanning.

The controller 706 includes a control service layer 707, a system resource manager 721, and a handler layer 708. The control service layer 707 analyzes a process request issued by the application layer 705, and generates an acquisition request for acquiring the hardware resources 704. The system resource manager (SRM) 721 controls one or more the hardware resources 704, and arbitrates between acquisition requests issued by the control service layer 707. The handler layer 708 controls the hardware resources 704 in response to an acquisition request made by the SRM 721.

The control service layer 707 includes a network control service (NCS) 713 corresponding to a communication part, a remote service (RS) 714, an operation panel control service, (OCS) 715, a facsimile control service (FCS) 716, an engine control service (ECS) 717, a memory control service (MCS) 718, an on-demand update service (OUS) 719, and a system control service (SCS) 720. In this manner, the control service layer 707 is configured to include one or more service modules.

The controller 706 is configured to include an API (application interface) 728 that is capable of receiving a process request from the application layer 705. This is done by use of predefined functions of the controller 706. The OS executes the individual software units of the application layer 705 and the controller 706 as concurrently running processes.

The process of the NCS 713 provides services that can be shared by applications in need of a network I/O. The process of NCS 713 may distribute data to individual applications as the data is received from the network according to various protocols, and may serve as an intermediary when data is sent from individual applications to the network.

For example, the NCS 713 controls data communication with network equipment connected through the network by use of HTTP (HyperText Transfer Protocol) based on the httpd (hypertext transfer protocol daemon).

The process of the RS 714 renders services using a network such as the Internet. The process of the OCS 715 controls an operation panel that serves as a communication means between a user and device control. The process of FCS 716 provides the application layer 705 with APIs used for facsimile transmission/reception through a network such as a PSTN or an ISDN, facsimile scanning, facsimile printing, the registration/referencing of facsimile data stored in backup memory, etc.

The process of the ECS 717 corresponds to an orientation detecting means and a rotation-angle setting (selecting) means, and controls an engine unit such as the black-&-white laser printer 725, the color laser printer 726, and the hardware resources 724. The process of the MCS 718 attends to memory control such as the acquisition and releasing of memory and the use of an HD. The process of the OUS 719 downloads a program to the memory in response to a notice from the network.

The process of the SCS 720 attends to application control, operation-panel control, system-screen display, LED display, hardware-resource control, interruption application control, etc.

The process of the SRM 721 together with the process of the SCS 720 attends to the system control, and controls the hardware resources 704. The process of the SRM 721 arbitrates in response to acquisition requests issued from the upper layer that make use of the hardware resources 704 such as the black-&-white laser printer 725 and the color laser printer 726, and attends to operation control.

In detail, the process of the SRM 721 checks whether the requested resource of the hardware resources 704 is available. If such a resource is available, the process of the SRM 721 notifies the upper layer that the requested resource of the hardware resources 704 is available. Further, the process of the SRM 721 attends to the scheduling of use of the hardware resources 704 in respect of the acquisition requests issued from the upper layer, and carries out the requested processing such as the supply of sheets and the formation of images in the printer engine, memory allocation, file generation, etc.

The handler layer 708 includes a facsimile control unit handler (FCUH) 722 for controlling a facsimile control unit (FCU), and further includes an image memory handler (IMH) 723 for allocating a memory space to a process and controlling the memory allocated to the process. The SRM 721 and the FCUH 722 utilize an engine I/F 727 that allows a process request to be sent to the hardware resources 704 by use of predefined functions, thereby processing the process request for the hardware resources 704.

In this manner, the multi-function unit 701 uses the controller 706 to attend to the central control of processes required and shared by individual applications. In what follows, the hardware configuration of the multi-function unit 701 will be described.

Figure 3:
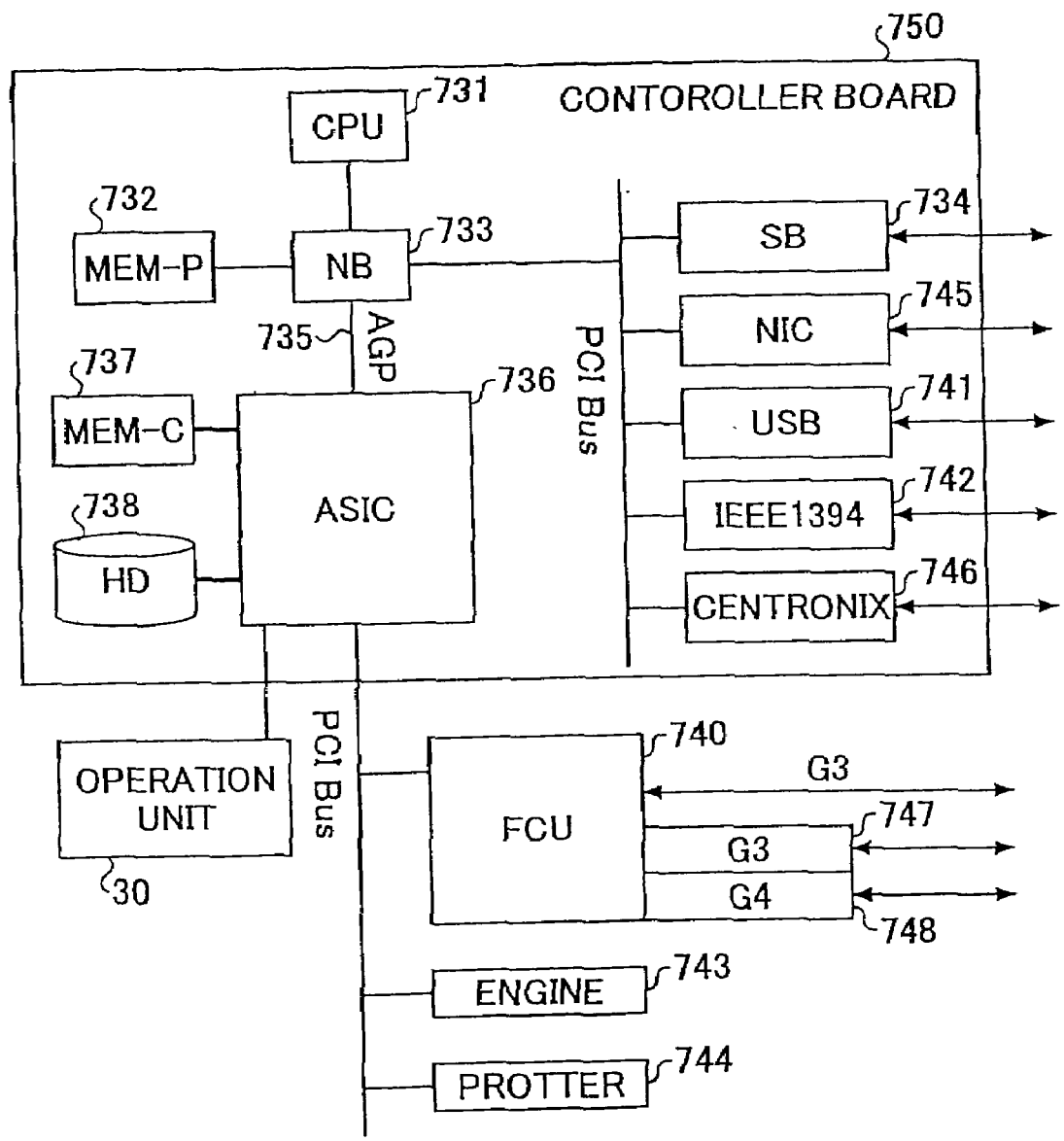
FIG. 3 is a block diagram showing an example of the hardware construction of the multifunction unit.

FIG. 3 is a block diagram showing an example of the hardware construction of the multifunction unit 701. The multi-function unit 701 includes a controller board 750, an operation unit 30, an FCU 740, an engine 743, and a plotter 744 that serves as a printing means. The FCU 740 includes a G3-standard unit 747 and a G4-standard unit 748.

The plotter 744, which is a general device that prints an image on a paper sheet, corresponds to the photosensitive body 15 of FIG. 1 in the narrow sense of the term, and corresponds to all the printing-related hardware and software of the multifunction unit 701 in the broad sense of the term.

The controller board 750 includes a CPU 731, an ASIC 736, an HD 738, a local memory (MEM-C) 737, a system memory (MEM-P) 732, a north bridge (NB) 733, a south bridge (SB) 734, a network interface card (NIC) 745, a USB device 741, an IEEE-1394 device 742, and a centronics device 746.

The operation unit 30 is connected to the ASIC 736 of the controller board 750. The SB 734, the NIC 745, the USB device 741, the IEEE-1394 device 742, and the centronics device 746 are connected to the NB 733 through a PCI bus.

The FCU 740, the engine 743, and the plotter 744 are connected to the ASIC 736 of the controller board 750 via the PCI bus.

In the controller board 750, the ASIC 736 is connected to the local memory 737, the HD 738, etc., and is connected to the CPU 731 via the NB 733 that is a CPU chip set. As the CPU 731 and the ASIC 736 are connected together via the NB 733, things can be taken care of even if the interface of the CPU 731 is not disclosed to the public.

The ASIC 736 and the NB 733 are not connected through the PCI bus, but are connected through an AGP (accelerated graphics port) 735. Connecting the ASIC 736 with the NB 733 through the AGP 735, rather than the PCI bus that is relatively slow, can avoid diminishing performance since it is necessary to control one or more processes of the application layer 705 and the controller 706 shown in FIG. 2.

The CPU 731 attends to overall control of the multi-function unit 701. The CPU 731 executes the NCS 713, the RS 714, the OCS 715, the FCS 716, the ECS 717, the MCS 718, the OUS 719, the SCS 720, the SRM 721, the FCUH 722, and the IMH 723 as processes running on the OS. Further, the CPU 731 activates and executes the printer application 709, the copy application 710, the facsimile application 711, and the scanner application 712 that constitute the application layer 705.

The NB 733 is a bridge used for providing connections between the CPU 731, the system memory 732, the SB 734, and the ASIC 736. The system memory 732 serves as a rendering memory of the multi-function unit 701. The SB 734 is a bridge that provides connections between the NB 733, a ROM, a PCI bus, and peripheral devices. The local memory 737 is used as a copy-purpose image buffer and a code buffer.

The ASIC 736 is an IC dedicated for image processing, and includes hardware elements for image processing. The HD 738 is a storage that stores image data, document data, programs, font data, various forms, and so on. The operation unit 30 receives operational inputs from the user, and provides display for the user.

Figure 4:
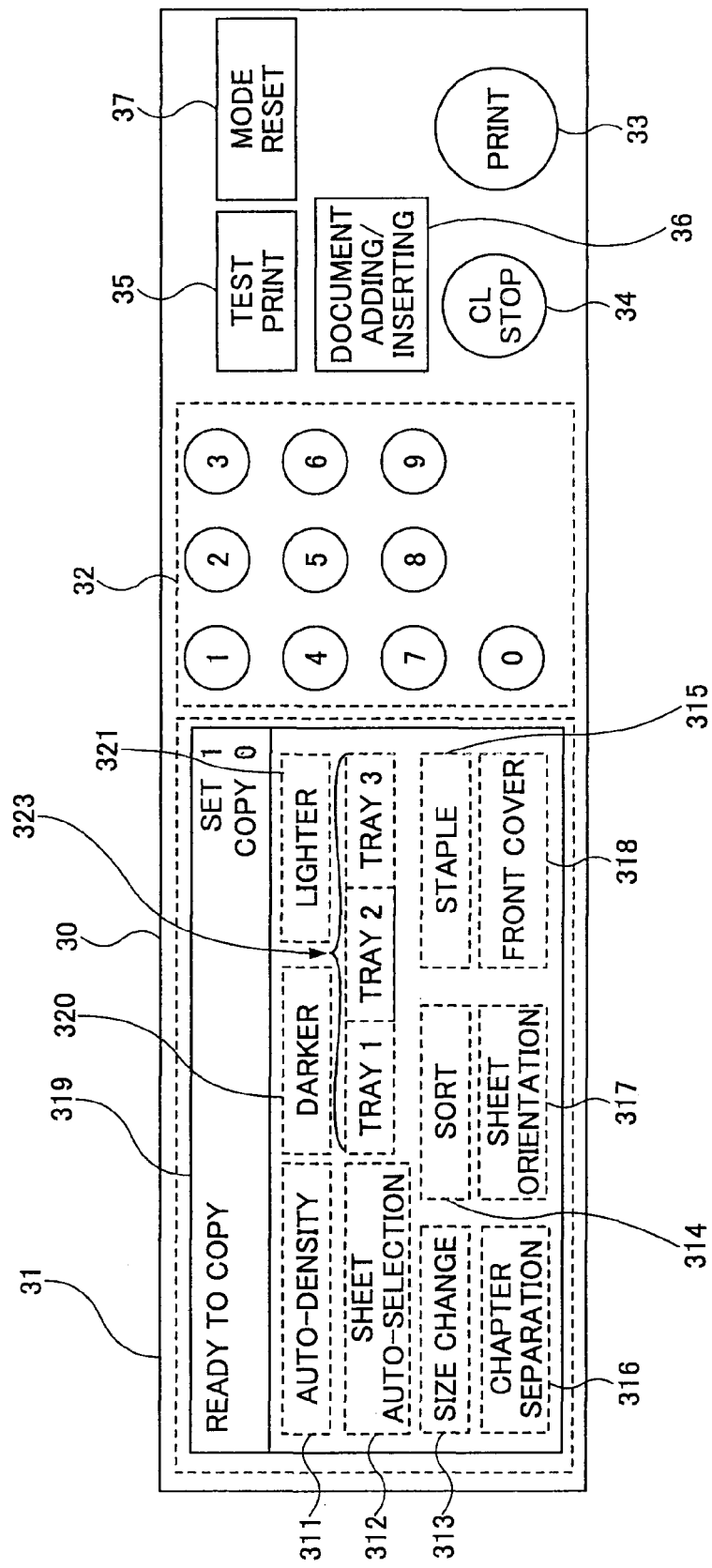
FIG. 4 is an illustrative drawing showing the operation unit provided for a user to enter instructions.

In the following, the operation unit 30 will be described. FIG. 4 is an illustrative drawing showing the operation unit 30 provided for a user to enter instructions. The operation unit 30 includes mode keys 31 for selecting various modes, a key pad 32 for indicating how many copies are to be made, a print key 33 for starting copying or printing, a stop key 34 for stopping copying, a test print key 35 for outputting a test print, a document adding/inserting key 36, and a mode reset key 37.

The mode keys 31 for selecting various modes and displaying messages include a auto-density key 311 for changing density, a density increase key 320, a density decrease key 321, a tray selecting key 323, a selected-tray displaying unit 323 for displaying a selected tray, an automatic sheet selection key 312, a scale key 313 for changing the scale, a sort key 314 for sorting, a staple key 315 for selecting stable settings, a chapter separation key 316, a document orientation key 317 for setting the orientation of a document, a front cover key 318, a display unit 319 for displaying messages for users, and other keys (not shown) including a print-mode key, a user-mode key, a rotation-mode key, etc.

In what follows, modes will be described. The chapter separation mode is used to provide printing on tab-index sheets when document images selected by a user are to be printed. Here, the tab-index sheets are chosen through other settings. The document orientation mode is used to make settings regarding an orientation in which a scanned document is to be printed. This enables printing to take into account the orientation of the scanned image even when a document is an A3 document or the like that can only be oriented in one direction in the ADF or on the contact glass.

The front-cover mode is used when front-cover sheets selected by other settings are to be used for the beginning of the document and for the end of the document. The print mode includes a page-number printing function that automatically prints page numbers, and further includes a stamp printing function that inserts a registered picture as part of printing. In either mode, the user can select a page number from which the relevant printing starts. A user code mode allows a user to enter a number that identifies each user, thereby making it possible to control the number of uses and the number of copied pages on a user-specific basis. The rotation mode key allows an image to be rotated 0 degrees, 90 degrees, 180 degrees, or 270 degrees at the time of printing.

When tab-index sheets are used for chapter separation, selection is also made with respect to the positioning of the tab relative to images. Dedicated keys may be provided on the operation unit 30 for the purpose of such selection, or the initial setting may be utilized to make such selection.

When tab-index sheets are printed, the indexing tabs are positioned at the rear end of the sheets that are being conveyed, as previously described.

With regard to the staple mode that can be selected at the time of printing, there is a limit to the number of copied pages that can be stapled together, depending on the type of a finisher and the type and size of paper sheets. If the number of copied pages exceeds this limit, a message will be displayed on the operation unit 30 to notify the user that stapling cannot be done. Such a decision as to stapling can be made prior to the start of printing operation based on the number of document pages and the printing mode indicative of either single-side printing or double-side printing.

The user operates the keys on the operation unit 30 to select a copy mode, and presses the print key 33, which initiates the scanning of document sheets in the case of a copying operation, or initiates a printing job in the case of a printer operation. With the start of such an operation, software for supplying and printing paper sheets executes a selected copy mode on a printing-surface-by-printing-surface basis. The printing-surface-by-printing-surface processing is referred to as a process. A printing process is generated and issued to the ECS 717, thereby achieving sheet-conveyance control and printing operations. After the completion of printing, the completion of process execution is reported. When all the processes are completed, the printing operation comes to an end.

In the following, processing according to the present embodiment will be described. First, a description will be given of the processing for rotating images. Next, a description will be given with regard to the processing for positioning images in a correct position relative to the tab of the tab-index sheet.

When the chapter separation mode is selected, and when tab-index sheets are selected as the chapter delimiter, there is a need to arrange images in a correct position relative to the position of the tab of tab-index sheets. Here, arranging images in a correct position relative to the position of the tab means arranging images constantly in the same orientation such as in an upright position or in a horizontal position with the top end of the image being on the left, with such arrangement being kept when the tab-index sheets and other print sheets are aligned such that the longer side of the tab-index sheets matches the longer side of the other print sheets.

Figure 5:
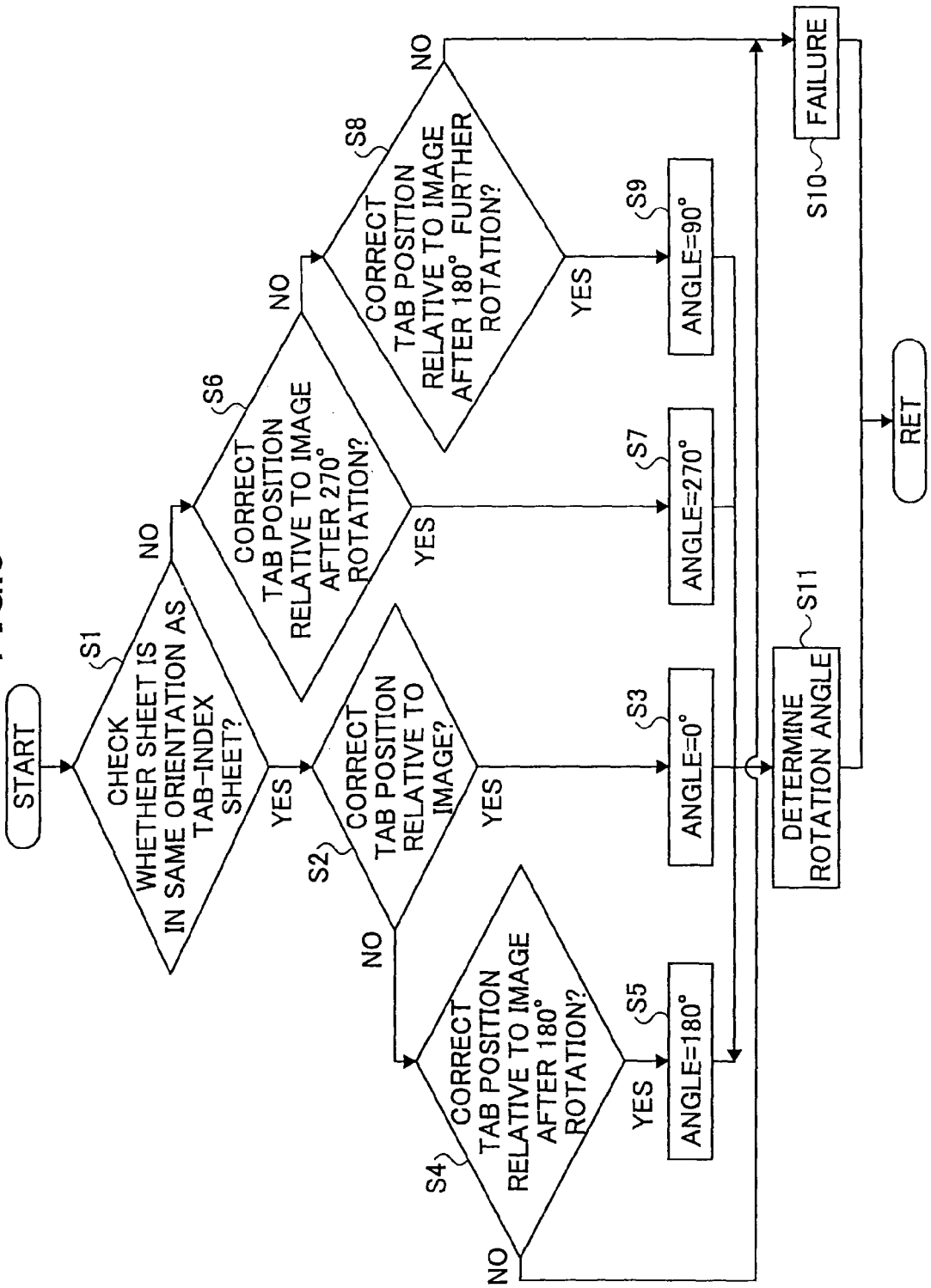
FIG. 5 is a flowchart of a procedure of determining the rotation angle of an image in order to arrange the image in a correct position relative to the tab of a tab-index sheet.

FIG. 5 is a flowchart of a procedure of determining the rotation angle of an image in order to arrange the image in a correct position relative to the tab of a tab-index sheet. This procedure is carried out by the ECS 717.

The procedure will be described with reference to FIG. 5. When the user selects the chapter separation mode, and presses the print key 33, the multi-function unit 701 starts scanning the stack of document sheets. The multi-function unit 701 selects a print-sheet tray and a tab-index-sheet tray, and starts the procedure for determining the rotation angle. The multi-function unit 701 is provided with a preferred-selection function that selects one of the horizontal sheet tray or the vertical sheet tray according to the preset preference.

At step S1, a check is made as to whether the orientation of a sheet is the same as the orientation of tab-index sheets. The orientation of the sheet is the same as the orientation of tab-index sheets when the longer (or shorter) side of the sheet and the longer (or shorter) side of the tab-index sheets extend in the same direction.

If the two orientations are the same, the ECS 717 checks at step S2 whether an image is in the correct positional relationship with the index tab. If it is in the correct positional relationship, the ECS 717 sets an angle to 0 degree at step S3, which is then determined as the rotation angle at step S11. If it is found at step S2 that the image is not in the correct positional relationship, the ECS 717 checks at step S4 whether the image being rotated 180 degrees is in the correct positional relationship with the index tab. If it is in the correct positional relationship, the ECS 717 sets an angle to 180 degrees at step S5, which is then determined as the rotation angle at step S11. Rotation by 0 degree or by 180 degrees as described above can cope with the case in which the orientation of the sheet is the same as the orientation of the tab-index sheets.

If it is found at step S4 that the image is not in the correct positional relationship, the ECS 717 halts the procedure at step S10 as having failed to identify the condition.

If it is found at step S1 that the orientation of the sheet is not the same as the orientation of the tab-index sheets, the ECS 717 checks at step S6 whether the image being rotated 270 degrees is in the correct positional relationship with the index tab. If it is in the correct positional relationship, the ECS 717 sets an angle to 270 degrees at step S7, which is then determined as the rotation angle at step S11.

If the image being rotated 270 degrees is not in the correct positional relationship, the ECS 717 checks at step S8 whether the image being further rotated 180 degrees is in the correct positional relationship with the index tab. If it is in the correct positional relationship, the ECS 717 sets an angle to 90 degrees at step S9 by adding 180 degrees to 270 degrees. The 90-degree angle is then determined as the rotation angle at step S11. If it is found at step S8 that the image being further rotated 180 degrees is not in the correct positional relationship, the ECS 717 halts the procedure at step S10 as having failed to identify the condition.

The procedure described above is carried out with respect to horizontally positioned sheets or vertically positioned sheets according to the selected tray type.

In this manner, document images are aligned in a correct orientation relative to the tab of tab-index sheets. After printing, therefore, the orientation of images is constant with respect to the tab, which eliminates a need to rotate the printed pages on which images are printed upside down.

In the following, a description will be given of another embodiment for image rotation in which all the images of a document are aligned in the same direction as the first image of the document.

In this procedure, a print sheet for the first image is selected according to the preset preferred-sheet-tray setting.

Figure 6:
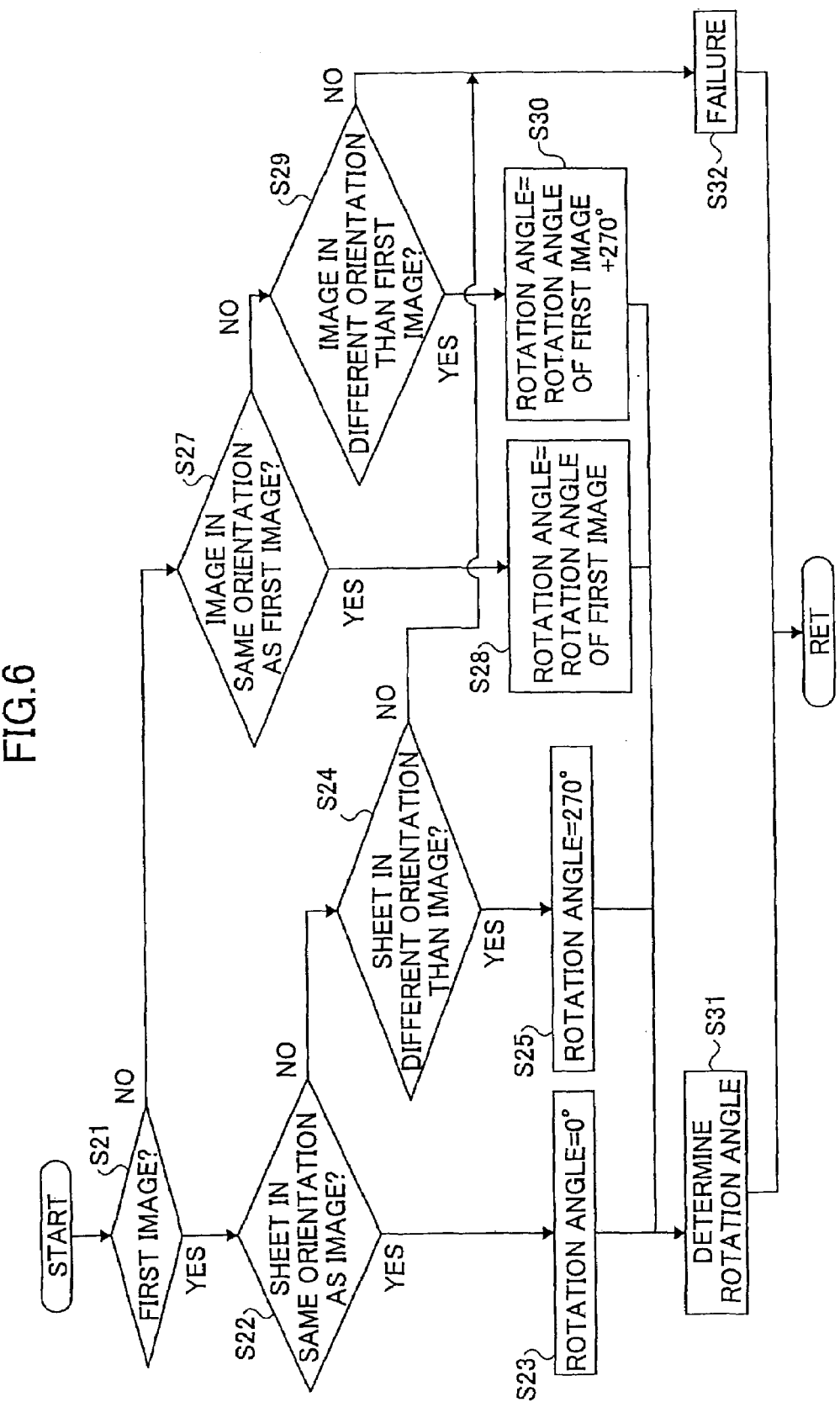
FIG. 6 is a flowchart of a procedure for aligning all the images of a document in the same direction as the first image of the document.

FIG. 6 is a flowchart of a procedure for aligning all the images of a document in the same direction as the first image of the document.

This procedure starts when a preferred-sheet-tray setting is made and the print key 33 is pressed. As the multi-function unit 701 starts scanning a stack of document sheet, the ECS 717 checks at step S21 whether a scanned image is the first image.

If it is the first image, the ECS 717 checks at step S22 whether the orientation of the image is the same as the orientation of a sheet of the selected sheet tray. The orientation of the image is the same as the orientation of a sheet of the selected sheet tray if the image is in an upright position for vertically positioned sheet or if the image is in a horizontal position with its top end being on the left for horizontally positioned sheet.

If the orientations are the same at step S22, the ECS 717 sets an angle to 0 degree at step S23, which is then determined as the rotation angle at step S31. If the orientations are not the same at step S22, the ECS 717 checks at step S24 whether the orientation of the image is different from the orientation of the sheet. If it is found that the orientations are different at step S24, the ECS 717 sets an angle to 270 degrees at step S25, which is then determined as the rotation angle at step S31.

If it is turned out at step S24 that the orientations are not different, the orientations are neither the same nor different. In this case, the ECS 717 halts the procedure at step S32 as having failed to identify the condition. The printing operation is not resumed until proper sheets for printing are provided.

If step S21 finds that the image is not the first image, the ECS 717 checks at step S27 whether the image is oriented in the same direction as the sheet of the first image. If it is oriented in the same direction, the ECS 717 sets an angle to the rotation angle of the first image at step S28, followed by determining this angle as the rotation angle at step S31.

If step S27 finds that the image is not oriented in the same direction, the ECS 717 checks at step S29 whether the image is oriented in a different direction than the sheet of the first image. If it is found at step S29 that the image is oriented in a different direction, the ECS 717 sets an angle to the rotation angle of the first image being rotated 270 degrees at step S30, followed by determining this angle as the rotation angle at step S31. If it is turned out at step S29 that the orientations are not different, the ECS 717 halts the procedure at step S32 as having failed to identify the condition.

In this manner, scanned images following the first image are aligned in the same orientation as-the first image, so that all the printed pages will have images in the same orientation as the first image. That is, printed images are all consistent orientation-wise.

In the following, a description will be given of a procedure using tab-index sheets and the first image as references, in which images following the first image are aligned in the same direction as the first image and in the correct positional relation with the tab of the tab-index sheets.

Figure 7:
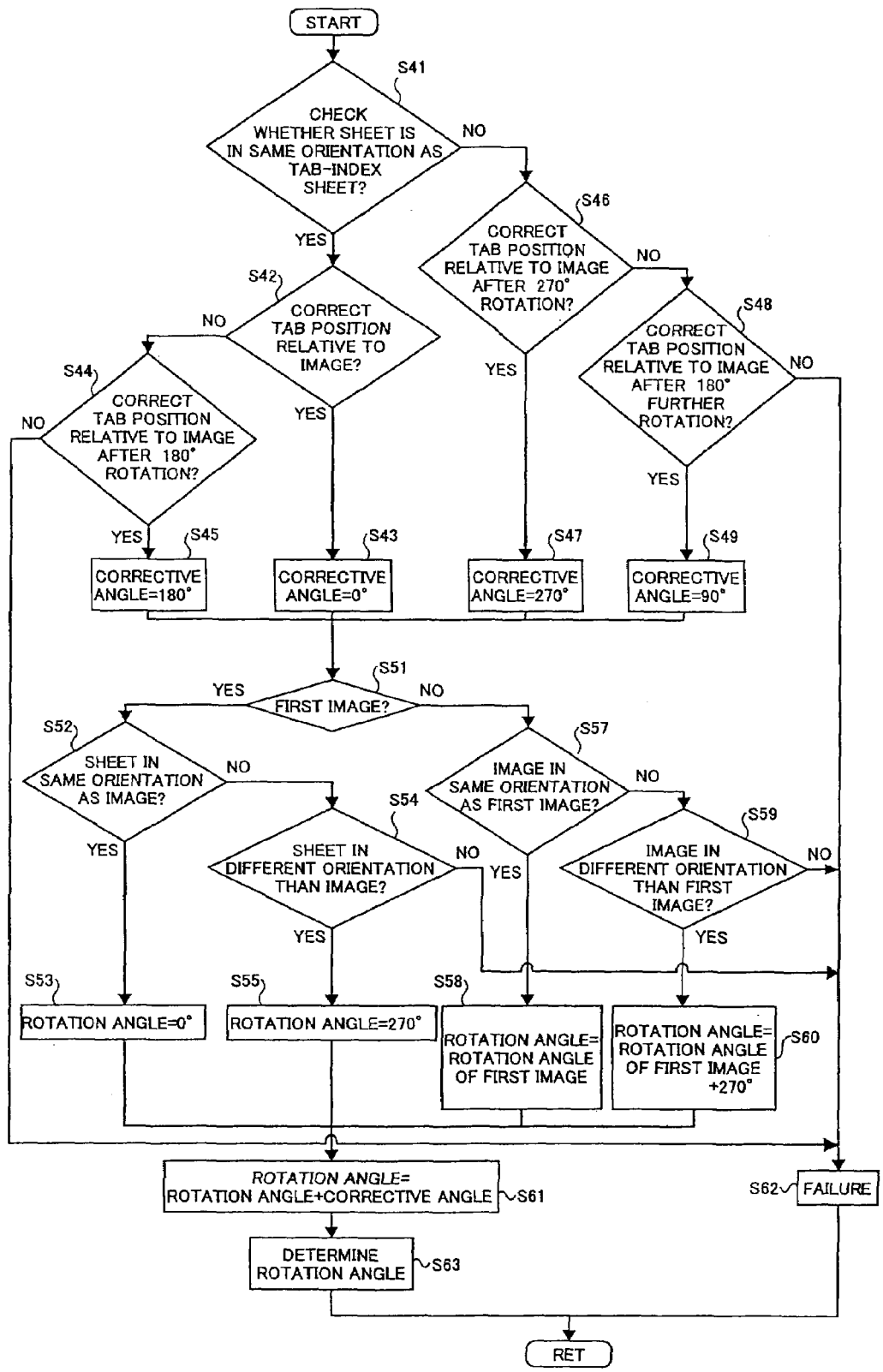
FIG. 7 is a flowchart of the procedure for aligning images in the same orientation as the first image and in the correct positional relation with the tab of tab-index sheets.

FIG. 7 is a flowchart of the procedure for aligning images in the same orientation as the first image and in the correct positional relation with the tab of tab-index sheets.

This procedure is the same as the previous example in that a print-sheet tray and an tab-index-sheet tray are selected in the multi-function unit 701. In the following, the procedure will be described with reference to the flowchart.

Upon the start of operation, the multifunction unit 701 scans a stack of document sheets, and selects a print-sheet tray and an tab-index-sheet tray. The ECS 717 checks at step S41 whether the orientation of a sheet is the same as the orientation of tab-index sheets. If it is found at step S41 that the two orientations are the same, the ECS 717 checks at step S42 whether an image is in the correct positional relationship with the index tab.

Here, aligning images in the correct positional relationship with the index tab means arranging images constantly in the same orientation such as in an upright position or in a horizontal position with the top end of the image being on the left, with such arrangement being kept when the tab-index sheets and other print sheets are aligned such that the longer side of the tab-index sheets matches the longer side of the other print sheets.

If it is found at step S42 that the correct positional relationship exists, the ECS 717 sets a corrective angle to 0 degree at step S43. If it is found at step S42 that the image is not in the correct positional relationship, the ECS 717 checks at step S44 whether the image being rotated 180 degrees is in the correct positional relationship with the index tab.

If it is found at step S44 that the correct positional relationship exists, the ECS 717 sets a corrective angle to 180 degrees at step S45. If it is found at step S44 that the image is not in the correct positional relationship, the ECS 717 halts the procedure at step S62 as having failed to identify the condition.

If it is found at step S41 that the orientation of the sheet is not the same as the orientation of the tab-index sheets, the ECS 717 checks at step S46 whether the image being rotated 270 degrees is in the correct positional relationship with the index tab. If it is found at step S46 that the correct positional relationship exists, the ECS 717 sets a corrective angle to 270 degrees at step S47.

If it turns out at step S46 that the image being rotated 270 degrees is not in the correct positional relationship, the ECS 717 checks at step S48 whether the image being further rotated 180 degrees is in the correct positional relationship with the index tab.

If it is found at step S48 that the correct positional relationship exists, the ECS 717 sets a corrective angle to 90 degrees at step S49 by adding 180 degrees to 270 degrees. If it is found at step S48 that the correct positional relationship does not exist, the ECS 717 halts the procedure at step S62 as having failed to identify the condition.

The procedure then moves to step S51 while keeping the corrective angle that is determined as described above. At step S51, the ECS 717 checks whether the image is the first image of the document. If it is the first image, the ECS 717 checks at step S52 whether the orientation of the sheet is the same as the orientation of this image. If it is found at step S52 that the orientations are the same, the ECS 717 sets a rotation angle to 0 degree at step S53.

If it is found at step S52 that the orientations are not the same, the ECS 717 checks at step S54 whether the orientation of the image is different from the orientation of the sheet. If it is found that the orientations are different at step S54, the ECS 717 sets a rotation angle to 270 degrees at step S55.

If it is turned out at step S54 that the orientations are not different, the ECS 717 halts the procedure at step S62 as having failed to identify the condition. The printing operation is not resumed until proper sheets for printing are provided.

If step S51 finds that the image is not the first image, the ECS 717 checks at step S57 whether the image is oriented in the same direction as the sheet of the first image. If it is oriented in the same direction, the ECS 717 sets a rotation angle equal to the rotation angle of the first image at step S58. If step S57 finds that the image is not oriented in the same direction, the ECS 717 checks at step S59 whether the image is oriented in a different direction than the sheet of the first image.

If it is found at step S59 that the image is oriented in a different direction, the ECS 717 sets a rotation angle equal to the rotation angle of the first image being rotated 270 degrees at step S60. If it is turned out at step S59 that the orientations are not different, the ECS 717 halts the procedure at step S62 as having failed to identify the condition.

The ECS 717 obtains the final rotation angle by adding the corrective angle previously obtained to the rotation angle obtained above.

According to this procedure, the orientation of images following the first image is determined based on the first image and the tab-index sheets, so that all the printed pages will have images in the same orientation as the first image and in the correct positional relationship with the tab-index sheets. That is, printed images are all consistent orientation-wise relative to the first image.

A description has been made of the procedure for aligning images in a correct orientation relative to tab-index sheets by using the index tab as a reference, the procedure for aligning images in the same orientation as the first image by using the first image as a reference, and the procedure for aligning images in the same orientation as the first image and in the correct positional relation with tab-index sheets by using the first image and the tab-index sheets as references.

In what follows, a description will be given with regard to an actual printing operation which prints images on tab-index sheets according to the procedures as described above.

Figure 8:
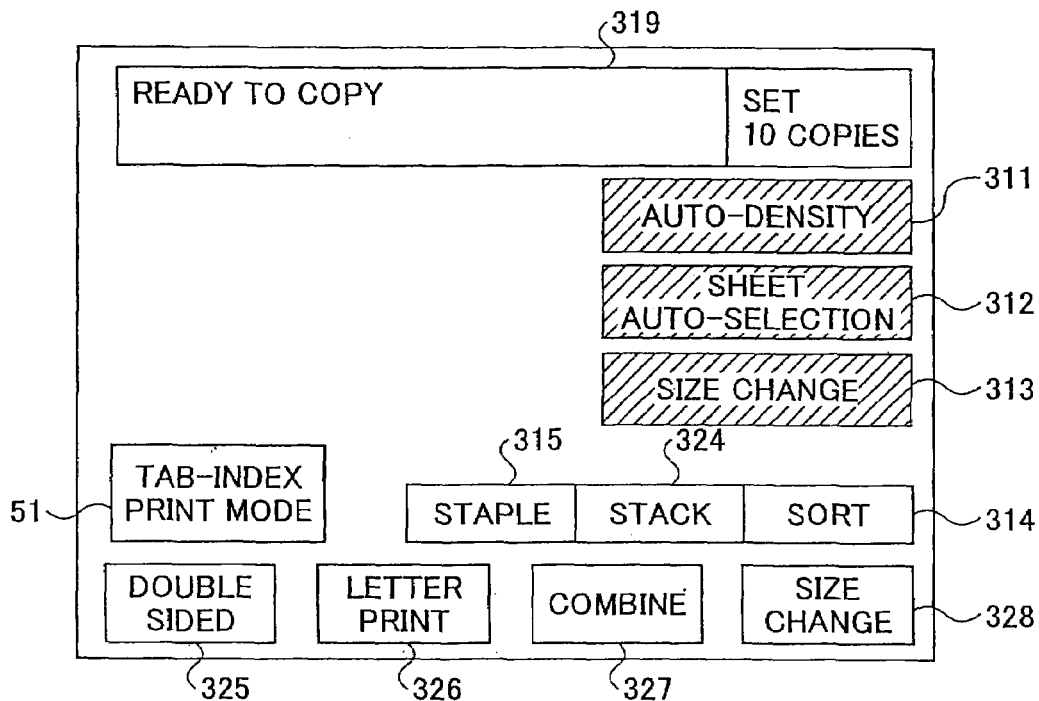
FIG. 8 is an illustrative drawing showing an operation unit which displays an index-print-mode key.

A description will be given first with regard to a message window displayed on the operation unit 30. FIG. 8 is an illustrative drawing showing the operation unit 30 which displays an index-print-mode key. This index-print mode is used to perform a printing operation that uses tab-index sheets, and is used to select a direction in which images are aligned with respect to the tab-index sheets.

In FIG. 8, the same elements as those of FIG. 4 are referred to by the same numerals, and a description thereof will be omitted.

Among the keys shown in FIG. 8, an index-print-mode key 51 is used to perform a printing operation that uses tab-index sheets. A double-side key 325 is used to select double-sided printing. A letter print key 326 is used to print a date, a stamp, etc. A combining key 327 is used to combine two A4 images as one A3 image, for example. A stack key 324 is used to print two copies of each page on a page-by-page basis when printing two copies of a single document.

Figure 9:
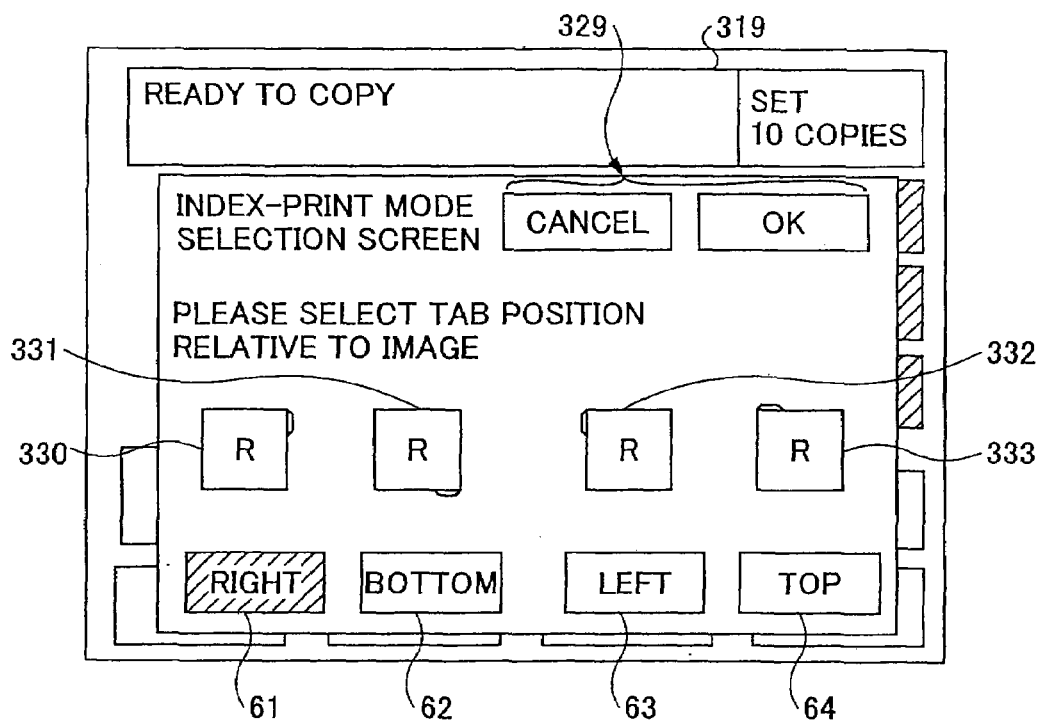
FIG. 9 is an illustrative drawing showing a screen for selecting an image orientation of tab-index sheets.

In FIG. 8 as described above, the selection of the index-print-mode key 51 by user operation prompts the displaying of a screen for selecting an image orientation of tab-index sheets as illustrated in FIG. 9.

The screen shown in FIG. 9 is used to select the position of the index tab as being either at the top edge, at the bottom edge, at the left edge, or at the right edge of a sheet. To this end, this screen shows index position selecting FIGS. 330, 331, 332, and 333 together with corresponding keys 61, 62, 63, and 64. With these keys, the user can select the position of an index tab.

Similar settings can be made to each tab-index sheet stored in a tray. Cancel/OK keys 329 are used to cancel or determine the selection of the position.

In what follows, an example of a printing operation that uses tab-index sheets will be described.

Figure 10:
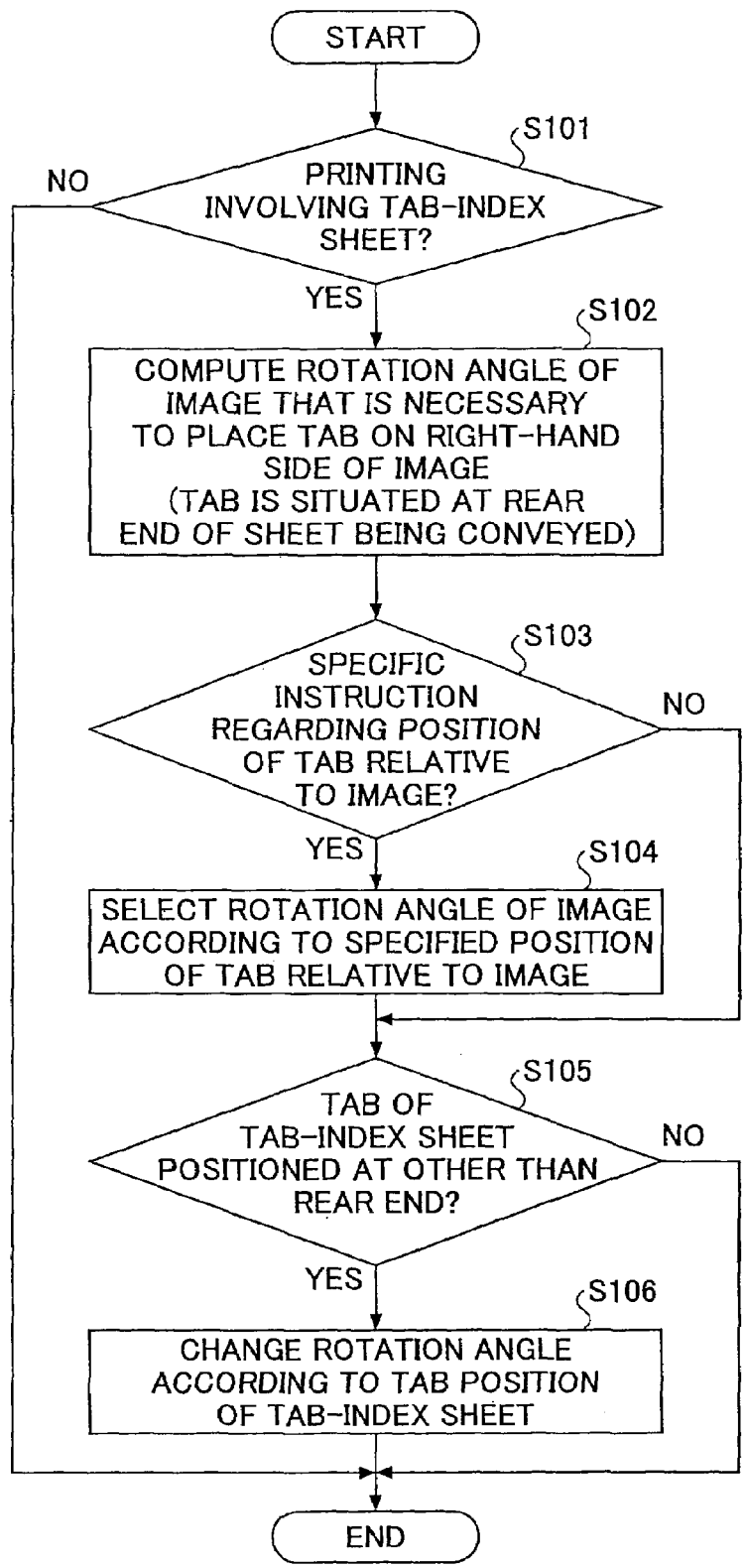
FIG. 10 is a flowchart of a printing procedure in a case in which there is a single selected position with respect to printing on tab-index sheets.

FIG. 10 is a flowchart of a printing procedure in a case in which there is a single selected position with respect to printing on tab-index sheets.

At step S101, the ECS 717 checks whether printing will be performed on sheets inclusive of tab-index sheets. If it is found at step S101 that printing will be performed on sheets inclusive of tab-index sheets, the ECS 717 computes a rotation angle that is needed to make the tab position of the image match the tab position of the tab-index sheets under the condition that the tab position is at the right-hand side of the printed image. When this is done, it is taken for granted that the tab is positioned at the rear end of a sheet being conveyed. The computed rotation angle varies depending on the machine construction as to the direction of sheet conveyance, as to whether an image formation surface is an upper surface or a lower surface, etc.

The machine construction is part of the specifications of the multi-function unit 701. Such specifications may define the position of the tab as being at the rear end, may define the direction in which sheets are conveyed, and may define which one of the upper side and the lower side of a sheet will have an image formed thereon.

At step S103, the ECS 717 checks whether there is an instruction regarding the position of a tab relative to the image. If there is an instruction, at step S104, the ECS 717 corrects the rotation angle of the image according to the selected position of the tab relative to the image. If it is found at step S103 that there is no instruction, the procedure moves to step S105.

At step S105, the ECS 717 checks whether the tab of the index sheet is situated at the rear end. If it is found at step S105 that the tab is not at the rear end, at step S106, the ECS 717 corrects the rotation angle of the image according to the tab position of the tab-index sheet. With this, the procedure comes to an end.

In this manner, when the tab of a tab-index sheet is located at the rear end of the sheet being conveyed, the rotation angle of an image is determined relative to the reference rotation angle at which the image is positioned to have the tab at the right-hand side thereof. Such determination is made based on the orientation of the image and the specified direction of the index tab relative to the image. If the index tab should come at the top edge, the image needs to be rotated 90 degrees clockwise. If the index tab should come at the left-hand-side edge, the image needs to be rotated 180 degrees clockwise. If the index tab should come at the bottom edge, the image needs to be rotated 270 degrees clockwise. Here, the orientation of an image refers to the orientation of a scanned image in the case of copying, or refers to the orientation of an image supplied from an external device.

If the index tab is located on the left-hand side relative to the direction in which a sheet is conveyed, a further 90-degree clockwise rotation is necessary. If the index tab is located at the front end in the direction in which a sheet is conveyed, a further 180-degree clockwise rotation is necessary. If the index tab is located on the right-hand side relative to the direction in which a sheet is conveyed, a further 270-degree clockwise rotation is necessary.

Figure 11:
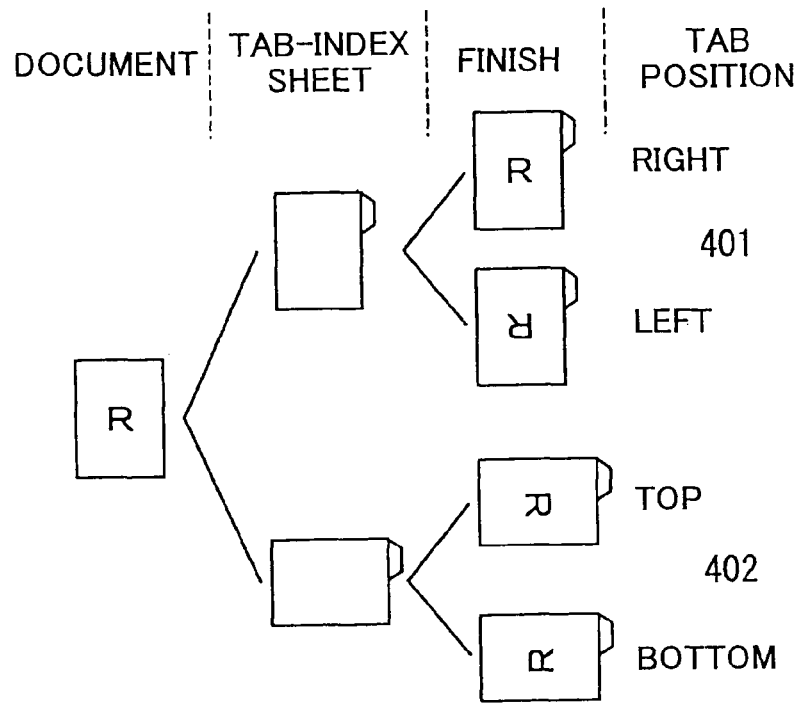
FIG. 11 is an illustrative drawing showing the way an image is printed as described above.

FIG. 11 is an illustrative drawing showing the way an image is printed as described above.

FIG. 11 shows a type 401 having a tab on the longer side, and further shows a type 402 having a tab on the shorter side. Depending on the type of a tab-index sheet, the rotation angle of an image being printed is controlled, so that printing is properly done for 4 different tab directions as shown in FIG. 11.

Figure 12:
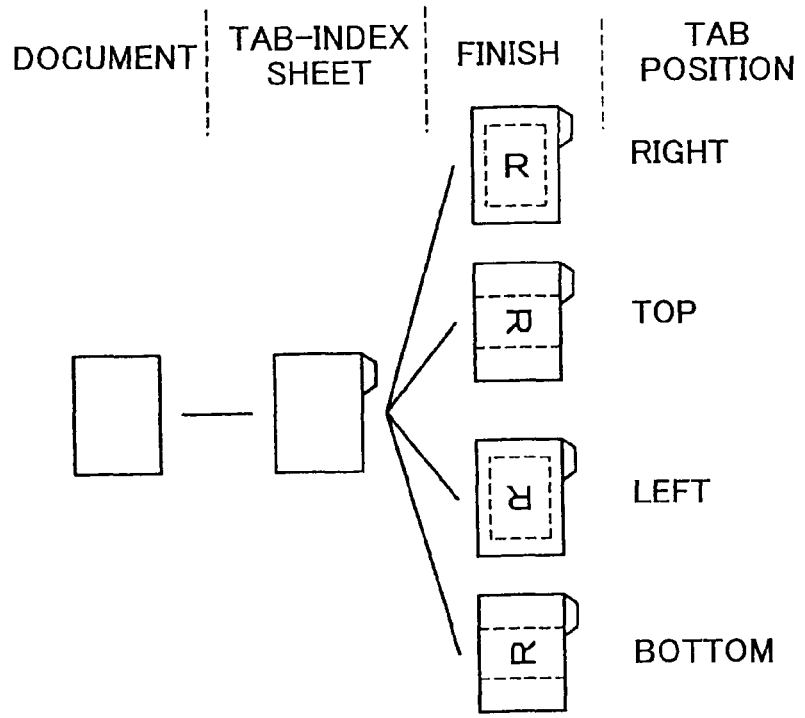
FIG. 12 is an illustrative drawing showing the way an image is printed when the image having a size as shown by dotted lines can fit in a tab-index sheet regardless of the orientation of the image.

FIG. 12 is an illustrative drawing showing the way an image is printed when the image having a size as shown by dotted lines can fit in the tab-index sheet regardless of the orientation of the image.

In the following, a description will be given of a case in which document images to be printed on tab-index sheets are a mixture of portrait images and landscape images.

When different types of tab-index sheets are provided for use for printing, specifying only one direction as the direction of an index tab relative to an image may result in the image failing to fit in either type of the tab-index sheets. That is, part of the image may slip beyond the edge of the sheet, thus failing to be printed. If two directions are specified as the direction of an index tab, the image being printed can fit in a given type of a tab-index sheet by choosing one of the specified directions so as to maintain a match between the direction of the tab of the tab-index sheet and the specified tab direction of the image.

Figure 13:
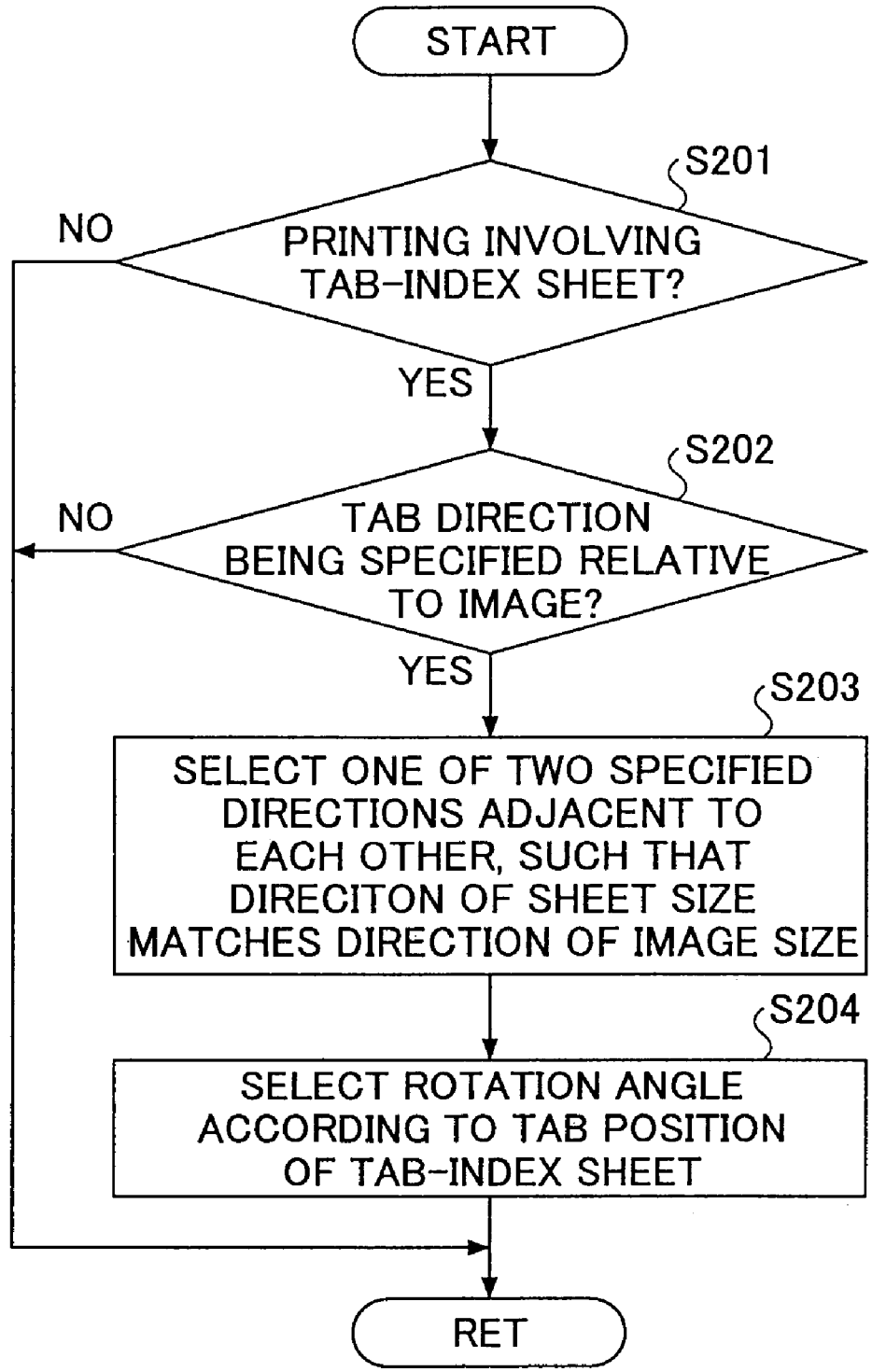
FIG. 13 is a flowchart of a procedure for printing images by specifying two preferred directions as the direction of an index tab.

FIG. 13 is a flowchart of a procedure for printing images by specifying two preferred directions as the direction of an index tab.

At step S201, the ECS 717 checks whether printing involves tab-index sheets. If the tab-index sheets are not involved, the ECS 717 completes the procedure.

At step S202, the ECS 717 checks whether there is any particular setting for the direction of an index tab relative to an image. If there is no particular setting, the ECS 717 completes the procedure.

If there is a setting for the direction of an index tab relative to an image, the ECS 717 selects one of the two specified directions (which are adjacent to each other) such that the orientation of the sheet matches the orientation of the image.

At step S204, the ECS 717 corrects the rotation angle of the image in conformity with the direction of the tab of the tab-index sheets. With this, the procedure comes to an end.

Figure 14:
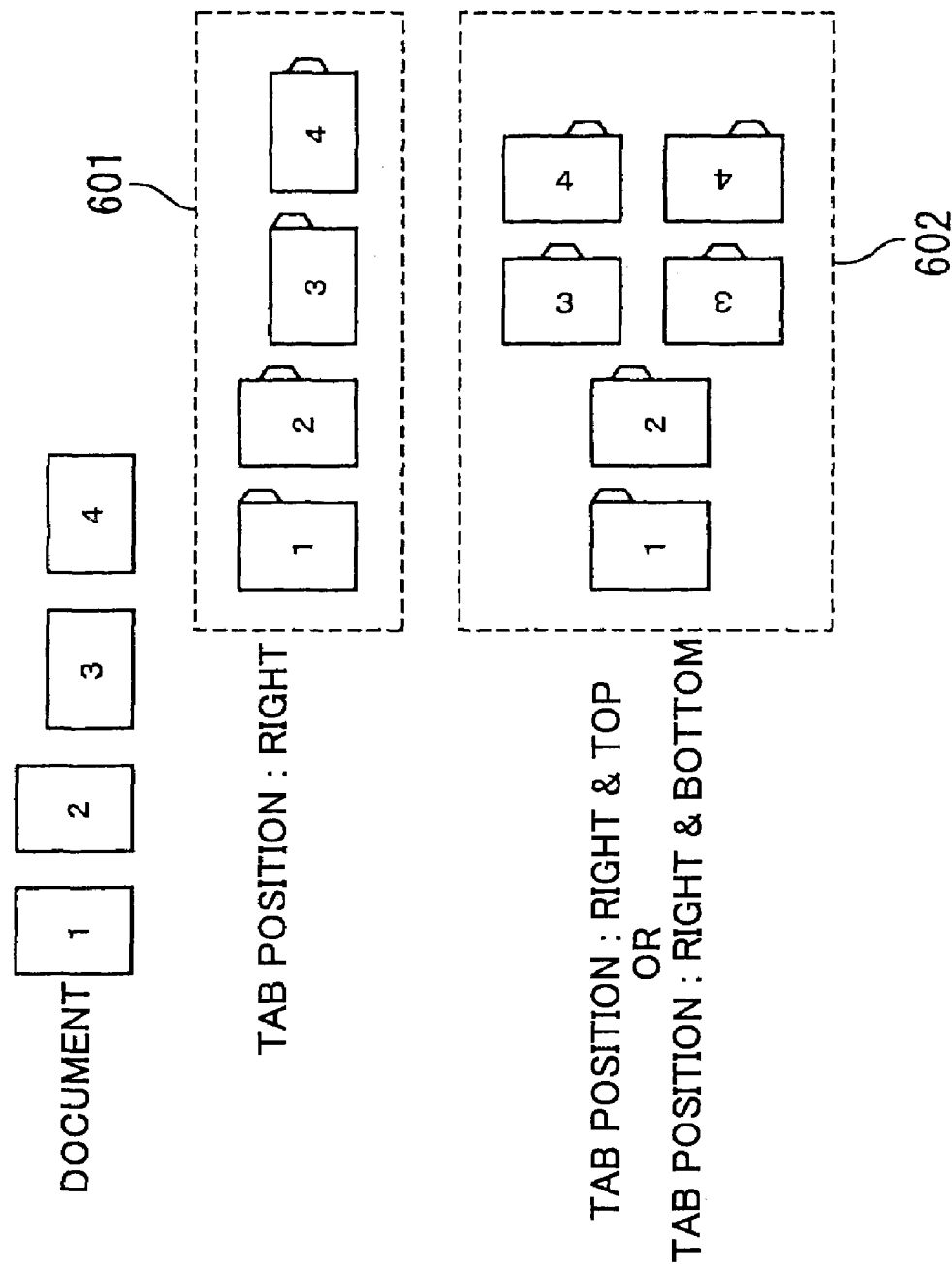
FIG. 14 is an illustrative drawing showing images that are printed according to the procedure of FIG. 13.

FIG. 14 is an illustrative drawing showing images that are printed according to the procedure of FIG. 13. In FIG. 14, images to be printed on tab-index sheets include two types of images, i.e., portrait images and landscape images that are equal in size.

Document images 1 and 2 are portrait, and document images 3 and 4 are landscape. A print example 601 corresponds to a case in which only one position of the index tab is specified. A print example 602 corresponds to a case in which two positions of the index tab are specified.

In the print example 601, only one position, i.e., the right-hand side of an image, is specified as the direction of an index tab. Because of this, an index tab is invariably provided on the right-hand side whether the image is a portrait or a landscape. In this case, two types of tab-index sheets need to be provided to ensure proper printing.

In the print example 602, on the other hand, two directions that are adjacent to each other are specified as the position of an index tab, i.e., the right-hand side and the topside or the right-hand side and the bottom side. In this case, images are rotated as necessary, so that only one type of tab-index sheets is needed to print both a portrait image and a landscape image.

In what follows, a description will be given of a case in which tab-index sheets stacked in tray have the same size as images, and have the same direction or a different direction. In this case, tab-index sheets having the same direction and the same size as images are given higher priority.

If no proper sheets are provided in a tray, or proper sheets having two different sizes are provided in trays, the size of a higher-priority sheet is regarded as the size of a tab-index sheet to be printed. If there is a sheet of a relevant size, printing is performed. If sheets having proper size are not provided, a request is made for the setting of sheets that are equal in size to the higher-priority sheet.

Figure 15:
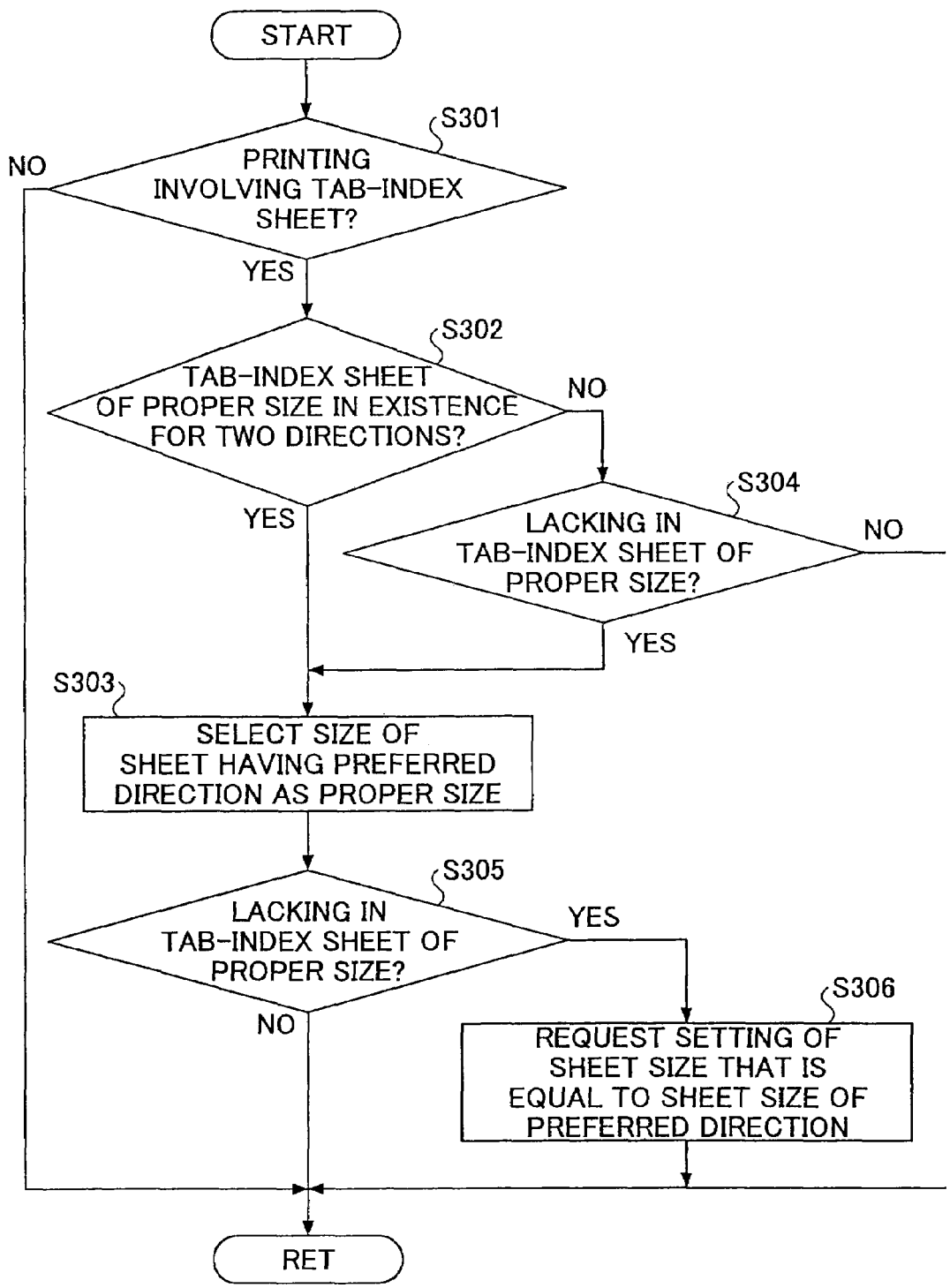
FIG. 15 is a flowchart of a procedure relating to the directions of an image index tab and a sheet index tab.

With reference to FIG. 15, at step S301, the ECS 717 checks whether printing involves tab-index sheets. If the printing does not involve tab-index sheets, the ECS 717 brings the procedure to an end.

If the printing involves tab-index sheets, the ECS 717 checks at step S302 whether the tab-index sheets having proper size are provided for two specified directions.

If the tab-index sheets having proper size are provided for the two specified directions, the ECS 717 proceeds to step S303. Otherwise, the ECS 717 moves to step S304.

At step S304, the ECS 717 checks whether tab-index sheets having the proper size are provided. If tab-index sheets having the proper size are provided, the ECS 717 brings the procedure to an end. If tab-index sheets having the proper size are not provided, the ECS 717 proceeds to step S303.

At step S303, the ECS 717 selects the size of a sheet having a preferred direction (higher-priority direction) as a proper size. At step S305, the ECS 717 checks whether tab-index sheets having the proper size are provided. If tab-index sheets having the proper size are not provided, the ECS 717 moves to S306, and requests the setting of sheets that are equal in size to the sheet having the preferred direction. If it is found at step S305 that tab-index sheets having the proper size are provided, the ECS 717 brings the procedure to an end. Here, requesting the setting of sheets means requesting the displaying of a message on the operation unit 30 that prompts a user to set the sheets.

In what follows, FIG. 16 will be referred to, and a description will be given of a case in which a mode involving tab-index sheets and a punching mode are both used. In the following, stapling may be exchanged for punching.

If the printing mode indicates printing that involves tab-index-sheets, the rotation angle of an image is computed from the specified index position, the orientation of an image, and the machine structure to provide the consistency of orientations where the index tab is situated at the rear end of a sheet being conveyed. If a punching mode is also specified, printing is suspended if the position of punched holes and the direction of index-tabs do not match.

Figure 16:
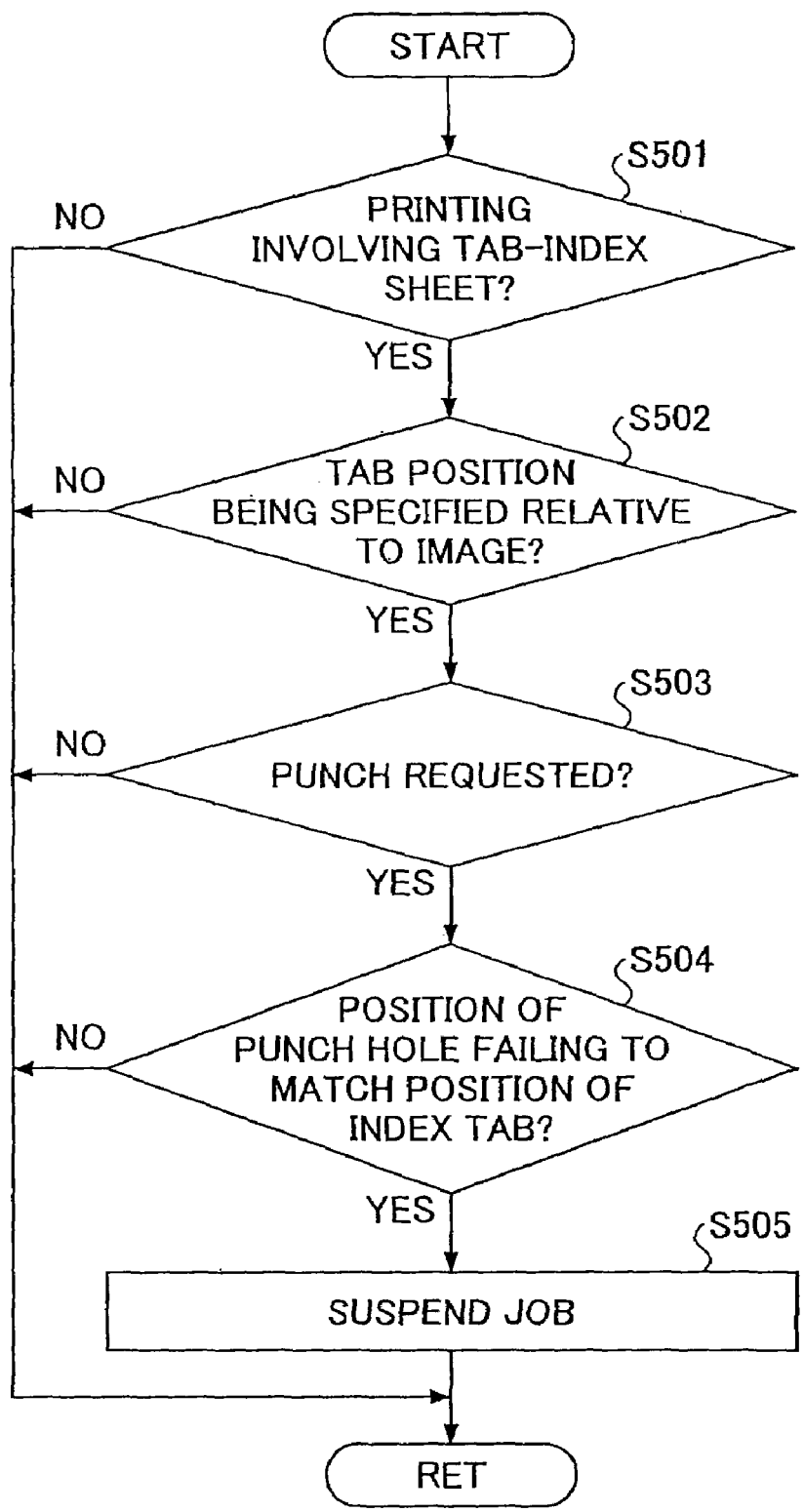
FIG. 16 is a flowchart of a procedure relating to a case in which a mode involving tab-index sheets and a punch mode are both used.

The procedure shown in FIG. 16 is comprised of a series of branch instructions, each of which will be described. Step S501 checks whether printing involves tab-index sheets.

Step S502 checks whether the position of an index tab relative to an image is specified.

Step S503 checks whether punching is requested.

Step S504 checks whether the specified position of punch holes do not match the specified position of an index tab.

If all the conditions checked at steps S501 through S504 are satisfied, the ECS 717 suspends the procedure at step S505. If any one of these conditions is not satisfied, the ECS 717 brings the procedure to an end.

Figure 17:
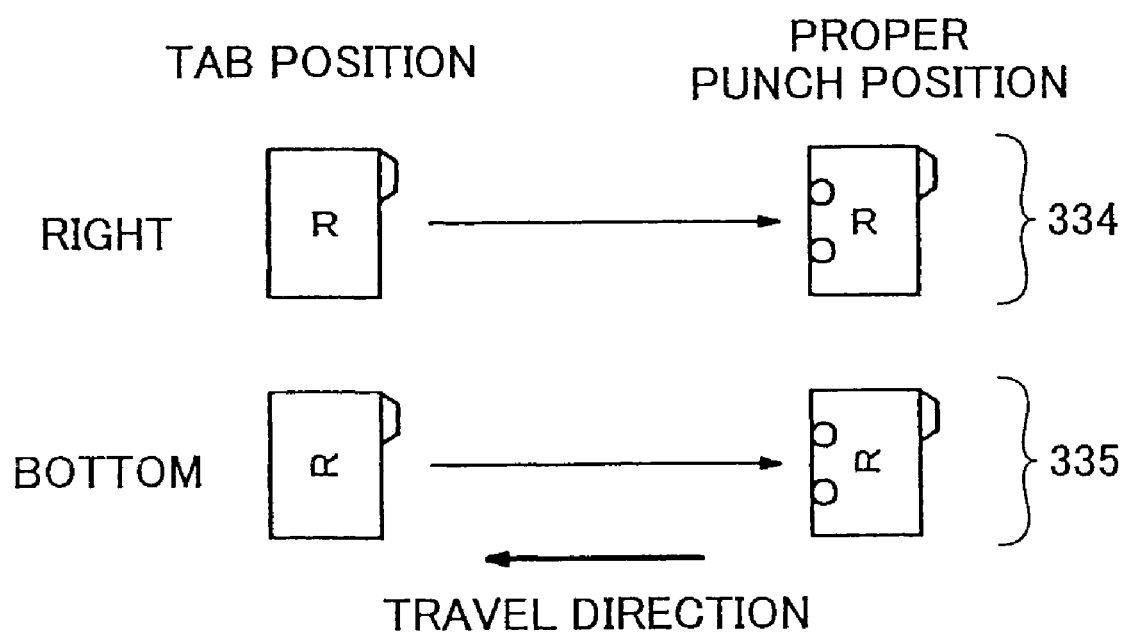
FIG. 17 is an illustrative drawing showing variations of the combination of the specified position of an index-tab and the specified position of punch holes.

FIG. 17 is an illustrative drawing showing variations of the combination of the specified position of an index-tab and the specified position of punch holes. Here, a punching mechanism is assumed to be only capable of punching at the front end of a sheet being conveyed. If the position of a tab is specified to be on the right-hand side with respect to a portrait image, the punch holes can be made as shown in a punch example 334. In the case of a landscape image, however, punching as shown in a punch example 335 is not possible if the position of a tab is specified as being on the right-hand side.

With the position of a tab being on the right-hand side, therefore, printing should be suspended if the position of punch holes is specified as being on the top side or the bottom side.

When the direction of a tab is specified as being on the bottom side as shown in the punch example 335, punch holes can be made only on the top side. If the position of punch holes is specified as being on the right or on the left, printing should be suspended.

Figure 18:
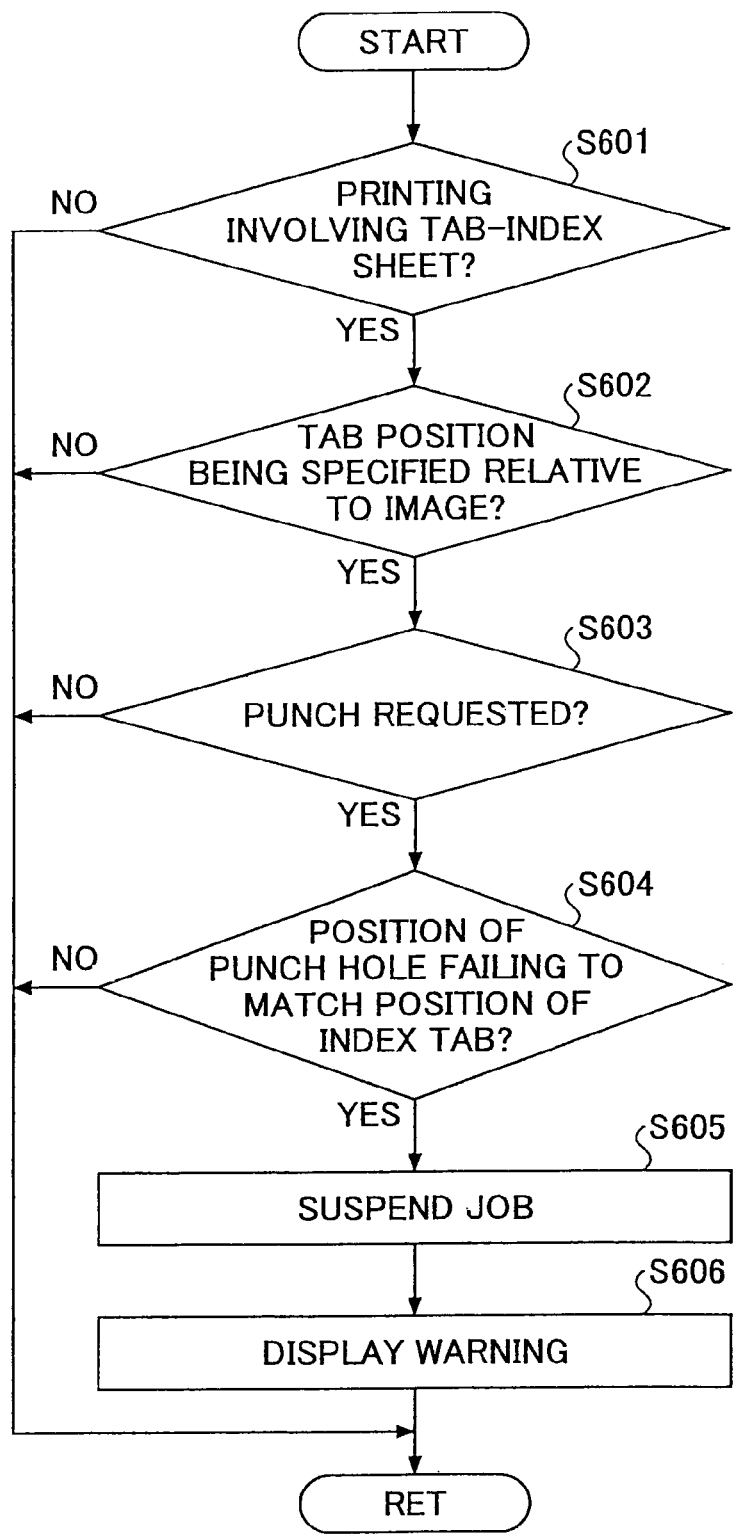
FIG. 18 is a flowchart of a procedure for warning a user upon suspension of a job.

FIG. 18 is a flowchart of a procedure for warning a user upon suspension of a job.

Steps S601 through S605 of this flowchart are identical to steps S501 through S505 of FIG. 16, and a description thereof will be omitted. If the ECS 717 suspends a job (procedure) at step S605, then, the ECS 717 displays a warning message at step S606. With this, the procedure comes to an end.

In response to the warning message, a user can give an instruction to match the position of punch holes with the direction of an index tab, followed by giving an instruction to resume the operation.

In the present invention, the CPU of a computer serving as an image forming apparatus executes programs to perform the procedures as described above where the programs are written in any programming language that provides instructions to be fed to the CPU. Such programs may be stored in a computer-readable record medium such as a CD-ROM, a DVD-ROM, a flexible disk, an MO, etc.

These programs may be loaded to the image forming apparatus from the record medium, or may be downloaded to the image forming apparatus via electro-communication lines such as a network, thereby enabling the image forming apparatus to print document images in tab-index sheets as described above.

Further, the present invention is not limited to these embodiments, but various variations and modifications may be made without departing from the scope of the present invention.

The present application is based on Japanese priority applications No. 2002-067572 filed on Mar. 12, 2002, No. 2002-067573 filed on Mar. 12, 2002, and No. 2003-38748 filed on Feb. 17, 2003, with the Japanese Patent Office, the entire contents of which are hereby incorporated by reference.

The invention claimed is:

1. An image forming apparatus which prints images on print sheets and inserts tab-index sheets between the printed print sheets, the image forming apparatus comprising:
    an orientation detecting unit which detects an orientation of a print sheet being supplied based on a tray from which the print sheet is supplied;
    a rotation-angle selecting unit which selects, automatically, without user intervention, a rotation angle of an image in order to match the orientation of the image to the detected orientation of the print sheet and a predetermined positional relationship with a tab of the tab-index sheets, the predetermined positional relationship indicating a position of the tab as being either at a top edge, at a bottom edge, at a left edge, or at a right edge of a tab-index sheet with respect to the image in an upright position; and
    a printing unit which prints the image being rotated by the selected rotation angle such that the tab comes at the position indicated by the predetermined positional relationship relative to the printed image,
    wherein said rotation-angle selecting unit checks whether the image is a first image, said rotation-angle selecting unit arranging the image in an orientation matching an orientation of the print sheet upon finding that the image is the first image, and said rotation-angle selecting unit arranging the image in an orientation matching an orientation of a sheet on which the first image is printed upon finding that the image is not the first image.

2. A non-transitory computer-readable medium having a program embodied therein for causing a processor to select a rotation angle of an image that is to be printed by an image forming apparatus using tab-index sheets, said program comprising:
    a program code configured to detect an orientation of a print sheet being supplied based on a tray from which the print sheet is supplied;
    a program code configured to automatically, without user intervention, select the rotation angle of the image based on arranging the image in an orientation matching the detected orientation of the print sheet and a predetermined positional relationship with a tab of the tab-index sheets, the predetermined positional relationship indicating a position of the tab as being either at a top edge, at a bottom edge, at a left edge, or at a right edge of a tab-index sheet with respect to the image in an upright position;
    a program code configured to check whether the image is a first image; and
    a program code configured to select the rotation angle of the image based on arranging the image in an orientation matching an orientation of the print sheet upon finding that the image is the first image, and selecting the rotation angle of the image based on arranging the image in an orientation matching an orientation of a sheet on which an image previously identified as the first image is printed upon finding that the image is not the first image.

3. A non-transitory computer-readable medium having a program embodied therein for causing a processor to select a rotation angle of an image that is to be printed by an image forming apparatus using tab-index sheets and to control printing of the image that is printed by the image forming apparatus using tab-index sheets, said program comprising:

a program code configured to detect an orientation of a print sheet being supplied based on a tray from which the print sheet is supplied;

a program code configured to allow selection of a position of a tab relative to the image, which is not printed on the tab, the selected position of the tab indicating a position of the tab as being either at a top edge, at a bottom edge, at a left edge, or at a right edge of a tab-index sheet with respect to the image in an upright position;

a program code configured to automatically, without user intervention, select the rotation angle of the image based on arranging the image in an orientation matching the detected orientation of the print sheet and a predetermined positional relationship with a tab of the tab-index sheets, the predetermined positional relationship indicating the selected position of the tab as being either at a top edge, at a bottom edge, at a left edge, or at a right edge of a tab-index sheet with respect to the image in an upright position; and a program code configured to rotate the image based on the selected rotation angle of the image to position a tab of the tab-index sheet at the selected position of the tab relative to the image.

4. A non-transitory computer-readable medium having a program embodied therein for causing a processor to select a rotation angle of an image that is to be printed by an image forming apparatus using tab-index sheets and to control printing of the image that is printed by the image forming apparatus using tab-index sheets, said program comprising:

a program code configured to detect an orientation of a print sheet being supplied based on a tray from which the print sheet is supplied;

a program code configured to allow selection of two positions of a tab relative to the image, which is not printed on the tab, each of the two selected positions of the tab indicating a position of the tab as being either at a top edge, at a bottom edge, at a left edge, or at a right edge of a tab-index sheet with respect to the image in an upright position;

a program code configured to automatically, without user intervention, select the rotation angle of the image based on arranging the image in an orientation matching the detected orientation of the print sheet and a predetermined positional relationship with a tab of the tab-index sheets, the predetermined positional relationship indicating the selected position of the tab as being either at a top edge, at a bottom edge, at a left edge, or at a right edge of a tab-index sheet with respect to the image in an upright position; and a program code configured to rotate the image based on the selected rotation angle of the image to position a tab of the tab-index sheet at either one of the two selected positions relative to the image.

5. A non-transitory computer-readable medium having a program embodied therein for causing a processor to select a rotation angle of an image that is to be printed by an image forming apparatus using tab-index sheets and to control printing of the image that is printed by the image forming apparatus using tab-index sheets, said program comprising:

a program code configured to detect an orientation of a print sheet being supplied based on a tray from which the print sheet is supplied;

a program code configured to allow selection of two positions of a tab relative to the image, which is not printed on the tab, while specifying one of the two positions as a preferred position, each of the two selected positions of the tab indicating a position of the tab as being either at a top edge, at a bottom edge, at a left edge, or at a right edge of a tab-index sheet with respect to the image in an upright position;

a program code configured to automatically, without user intervention, select the rotation angle of the image based on arranging the image in an orientation matching the detected orientation of the print sheet and a predetermined positional relationship with a tab of the tab-index sheets, the predetermined positional relationship indicating the selected position of the tab as being either at a top edge, at a bottom edge, at a left edge, or at a right edge of a tab-index sheet with respect to the image in an upright position; and a program code configured to rotate the image based on the selected rotation angle of the image to position a tab of the tab-index sheet at either one of the two selected positions of a tab relative to the image, where said specified one of the two selected positions is preferred over another one if both of the two selected positions of the tab relative to the image match the position of a tab of the tab-index.

6. The computer-readable medium as claimed in claim 3, wherein said program further comprises a program code unit configured to suspend the printing of the image and notify a user if the selected position of the relative to the image does not match the position of a tab of the tab-index sheets.

7. The computer-readable medium as claimed in claim 4, wherein said program further comprises a program code unit configured to suspend the printing of the image and notify a user if the position of the tab of the tab-index sheets does not match either one of the two selected positions of a tab relative to the image.

8. The computer-readable medium as claimed in claim 5, wherein said program further comprises a program code unit configured to suspend the printing of the image and notify a user if the position of the tab of the tab-index sheets does not match either one of the two selected positions of a tab relative to the image.

9. The computer-readable medium having a program as claimed in claim 2, wherein the image is not printed on the tab.

\* \* \* \* \*